US012046796B2

(12) United States Patent
Freebury

(10) Patent No.: US 12,046,796 B2
(45) Date of Patent: Jul. 23, 2024

(54) ANTENNA SYSTEM WITH DEPLOYABLE AND ADJUSTABLE REFLECTOR

(71) Applicant: TENDEG LLC, Louisville, CO (US)

(72) Inventor: Gregg E. Freebury, Louisville, CO (US)

(73) Assignee: TENDEG LLC, Louisville, CO (US)

( * ) Notice: Subject to any disclaimer, the term of this patent is extended or adjusted under 35 U.S.C. 154(b) by 0 days.

(21) Appl. No.: 18/199,716

(22) Filed: May 19, 2023

(65) Prior Publication Data

US 2023/0318163 A1 Oct. 5, 2023

Related U.S. Application Data

(63) Continuation of application No. 17/347,085, filed on Jun. 14, 2021, now Pat. No. 11,658,385, which is a continuation-in-part of application No. 16/723,627, filed on Dec. 20, 2019, now Pat. No. 11,489,245.

(60) Provisional application No. 62/782,599, filed on Dec. 20, 2018.

(51) Int. Cl.

| | |
|---|---|
| ***H01Q 1/12*** | (2006.01) |
| ***H01Q 3/08*** | (2006.01) |
| ***H01Q 15/16*** | (2006.01) |
| ***H01Q 19/13*** | (2006.01) |

(52) U.S. Cl.

CPC ......... *H01Q 1/1264* (2013.01); *H01Q 1/1235* (2013.01); *H01Q 3/08* (2013.01); *H01Q 15/161* (2013.01); *H01Q 19/13* (2013.01); *H01Q 1/1207* (2013.01)

(58) Field of Classification Search

CPC ...... H01Q 1/1264; H01Q 1/1235; H01Q 3/08; H01Q 15/161; H01Q 19/13; H01Q 1/1207

See application file for complete search history.

(56) References Cited

U.S. PATENT DOCUMENTS

2016/0352022 A1* 12/2016 Thomson ............... H01Q 1/288

* cited by examiner

*Primary Examiner* — Hoang V Nguyen
*Assistant Examiner* — Yonchan J Kim
(74) *Attorney, Agent, or Firm* — Craig R. Miles; CR MILES P.C.

(57) ABSTRACT

An antenna system including an antenna adjustable between a stowed configuration and a deployed configuration. The antenna includes a reflector having an annular array of spaced-apart ribs coupled to a hub, whereby the ribs can be adjustable between a collapsed configuration and an extended configuration in which the ribs outwardly extend from the hub. When the ribs dispose in the collapsed configuration, the antenna can be disposable in the stowed configuration; and when the antenna disposes in the deployed configuration, (i) the ribs can dispose in the extended configuration, and (ii) the reflector can be directionally adjustable, such as in both elevation and azimuth.

20 Claims, 33 Drawing Sheets

ANTENNA SYSTEM WITH DEPLOYABLE AND ADJUSTABLE REFLECTOR

This United States Patent Application is a continuation of U.S. patent application Ser. No. 17/347,085, filed Jun. 14, 2021, now U.S. Pat. No. 11,658,385, issued May 23, 2023, which is a continuation-in-part of U.S. patent application Ser. No. 16/723,627, filed Dec. 20, 2019, now U.S. Pat. No. 11,489,245, issued Nov. 1, 2022, which claims the benefit of U.S. Provisional Patent Application No. 62/782,599, filed Dec. 20, 2018, each hereby incorporated by reference herein.

I. SUMMARY OF THE INVENTION

A particular embodiment of the invention can include an antenna system, and methods of making and using such an antenna system, whereby the antenna system comprises a deployable antenna adjustable between a stowed configuration and a deployed configuration. The antenna includes a reflector having an annular array of spaced-apart ribs coupled to a hub, whereby the ribs can be adjustable between a collapsed configuration and an extended configuration in which the ribs outwardly extend from the hub. When the ribs dispose in the collapsed configuration, the antenna can be disposable in the stowed configuration; and when the antenna disposes in the deployed configuration, (i) the ribs can dispose in the extended configuration, and (ii) the reflector can be directionally adjustable, such as in both elevation and azimuth.

Naturally, further objects of the invention are disclosed throughout other areas of the specification, drawings, and claims.

II. A BRIEF DESCRIPTION OF THE DRAWINGS

III. DETAILED DESCRIPTION OF THE INVENTION

Figure 1A:
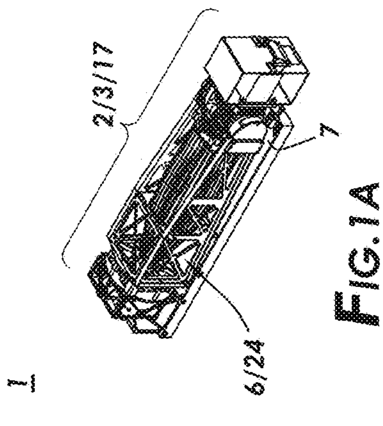
FIG. 1A is a perspective view of a particular embodiment of the instant antenna system including an antenna, whereby the antenna disposes in a stowed configuration.
Figure 1B:
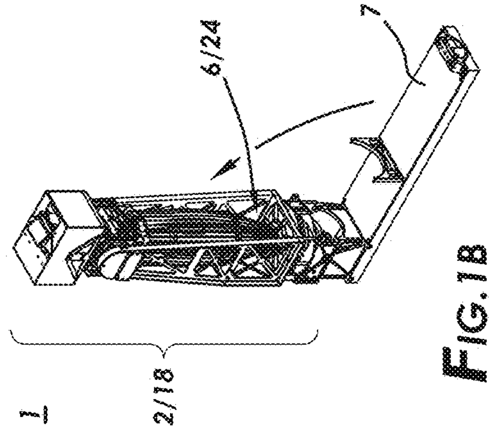
FIG. 1B is a perspective view of the pivoting and/or rotating of the particular embodiment of the antenna system shown in FIG. 1A toward a deployed configuration.
Figure 1C:
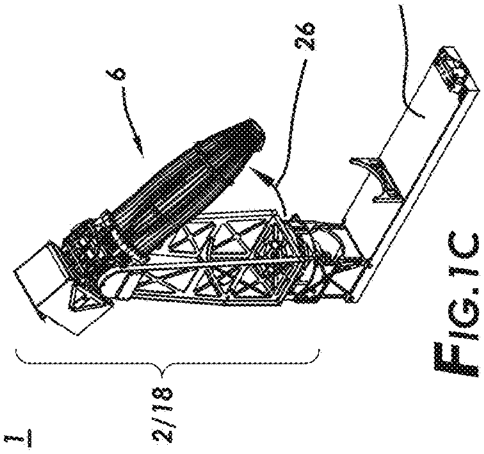
FIG. 1C is a perspective view of the pivoting and/or rotating of the particular embodiment of the antenna system shown in FIG. 1B toward the deployed configuration.
Figure 1D:
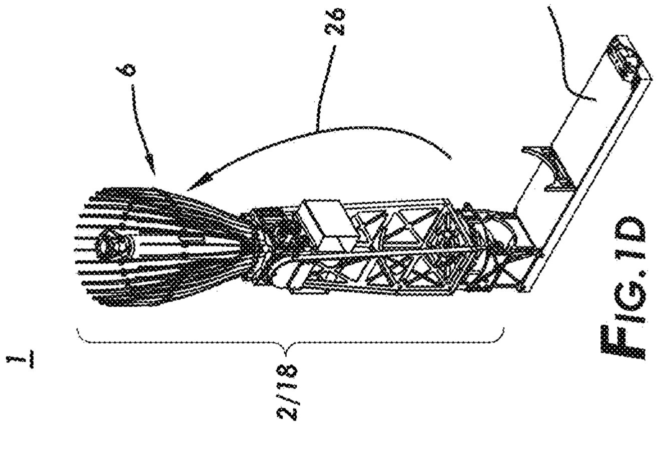
FIG. 1D is a perspective view of the pivoting and/or rotating of the particular embodiment of the antenna system shown in FIG. 1C toward the deployed configuration.
Figure 1E:
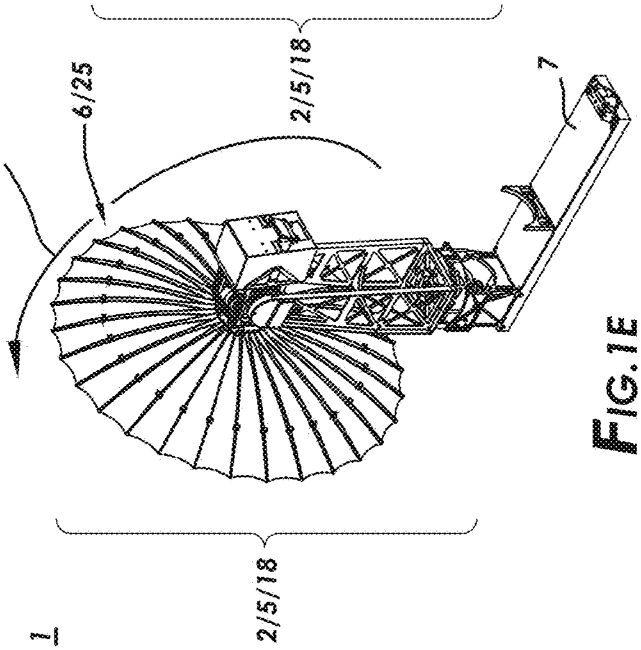
FIG. 1E is a perspective view of the particular embodiment of the antenna system shown in FIG. 1D, whereby the antenna disposes in the deployed configuration.
Figure 1F:
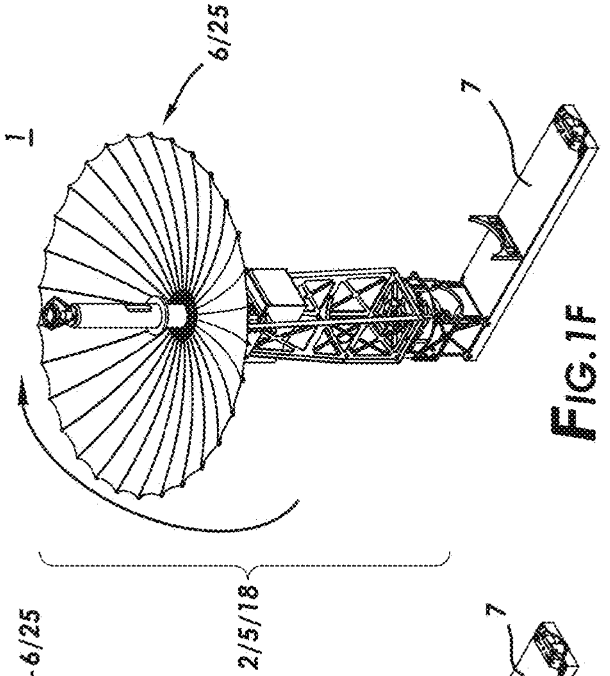
FIG. 1F is a perspective view of the particular embodiment of the antenna system shown in FIG. 1E, whereby the reflector is directionally adjusted.
Figure 2A:
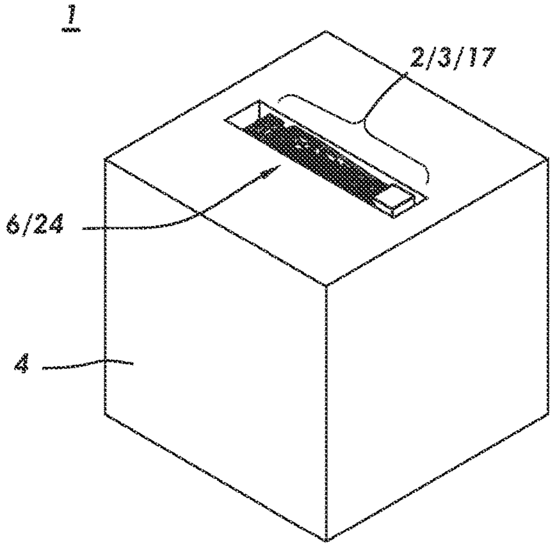
FIG. 2A is a perspective view of a particular embodiment of the instant antenna system including an antenna, whereby the antenna disposes in a stowed configuration for stowage within a container.
Figure 2B:
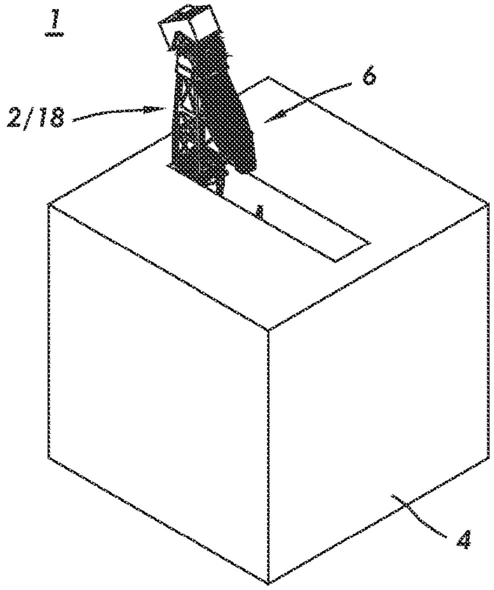
FIG. 2B is a perspective view of the pivoting and/or rotating of the particular embodiment of the antenna system shown in FIG. 2A toward the deployed configuration.
Figure 2C:
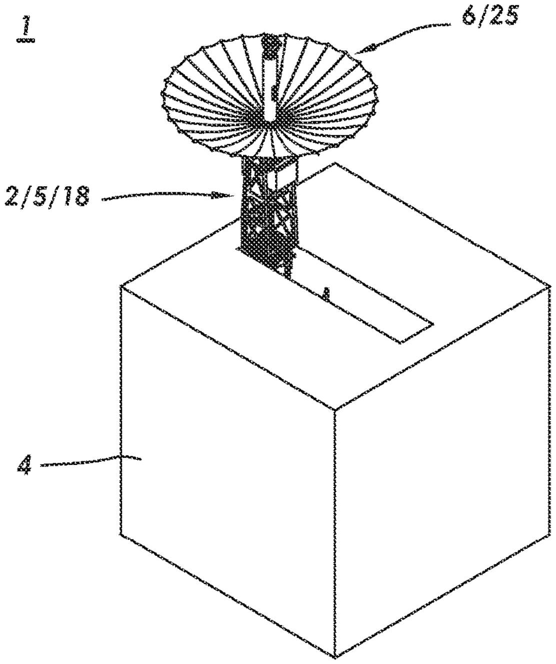
FIG. 2C is a perspective view of the particular embodiment of the antenna system shown in FIG. 2B, whereby the antenna disposes in a deployed configuration and is correspondingly deployed from within the container.
Figure 2D:
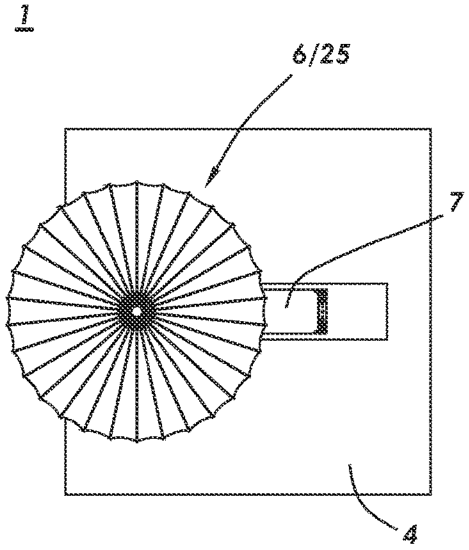
FIG. 2D is a top view of the particular embodiment of the antenna system shown in FIG. 2C.
Figure 3B:
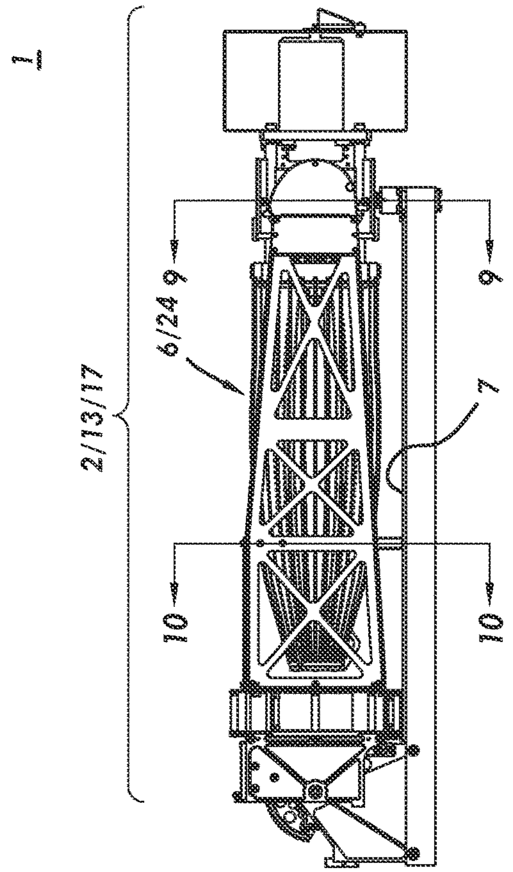
FIG. 3B is a front view of the particular embodiment of the antenna system shown in FIG. 3A.
Figure 3D:
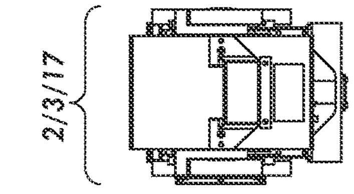
FIG. 3D is a first side view of the particular embodiment of the antenna system shown in FIG. 3A.
Figure 3A:
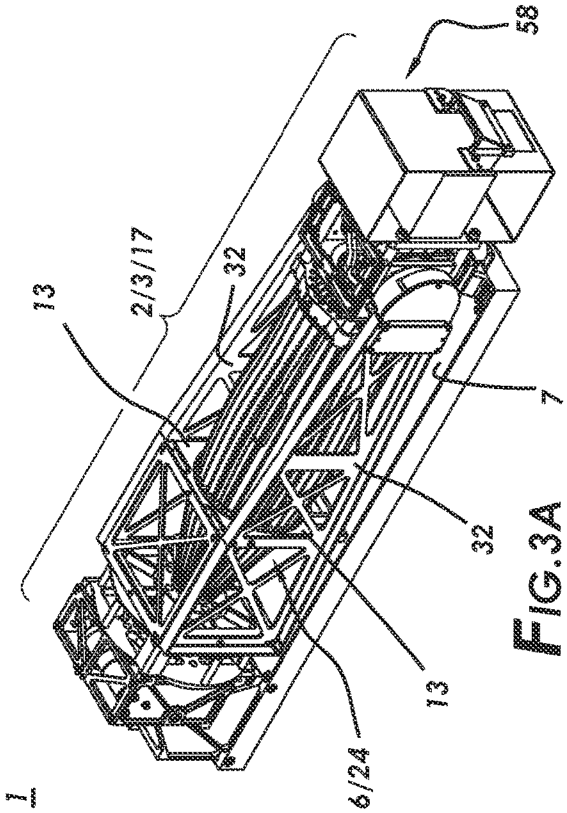
FIG. 3A is a perspective view of a particular embodiment of the instant antenna system including an antenna, whereby the antenna disposes in a stowed configuration.
Figure 3C:
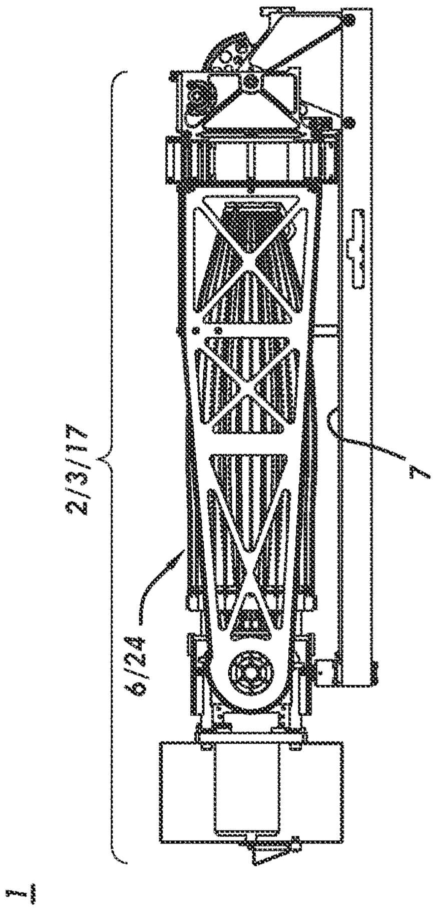
FIG. 3C is a rear view of the particular embodiment of the antenna system shown in FIG. 3A.
Figure 3E:
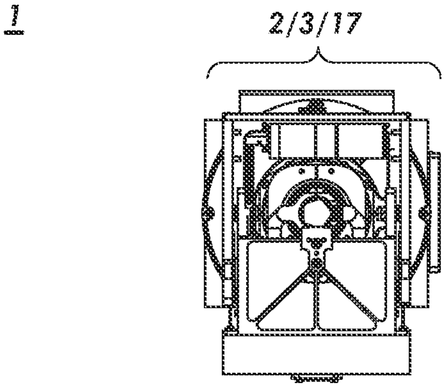
FIG. 3E is a second side view of the particular embodiment of the antenna system shown in FIG. 3A.
Figure 3F:
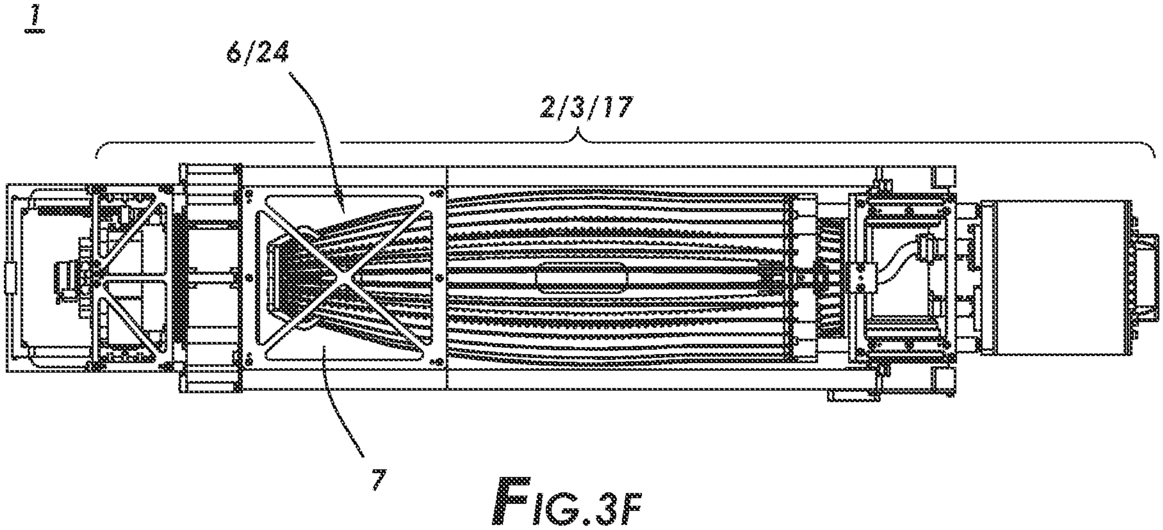
FIG. 3F is a top view of the particular embodiment of the antenna system shown in FIG. 3A.
Figure 3G:
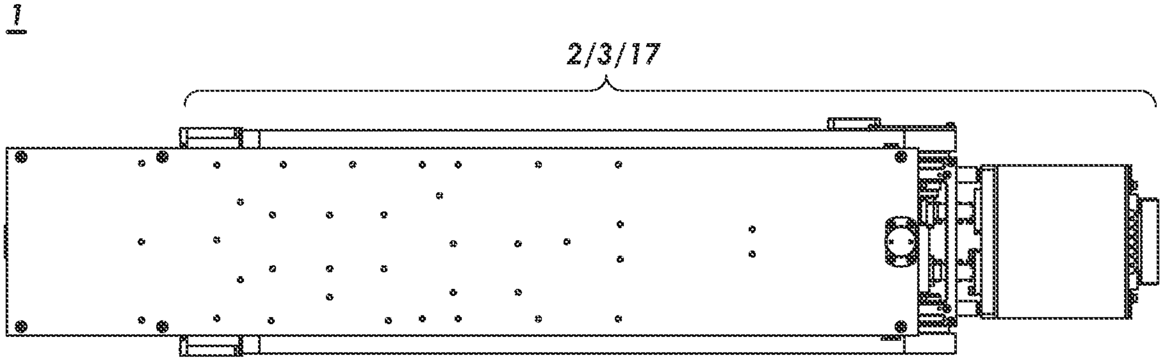
FIG. 3G is a bottom view of the particular embodiment of the antenna system shown in FIG. 3A.
Figure 4A:
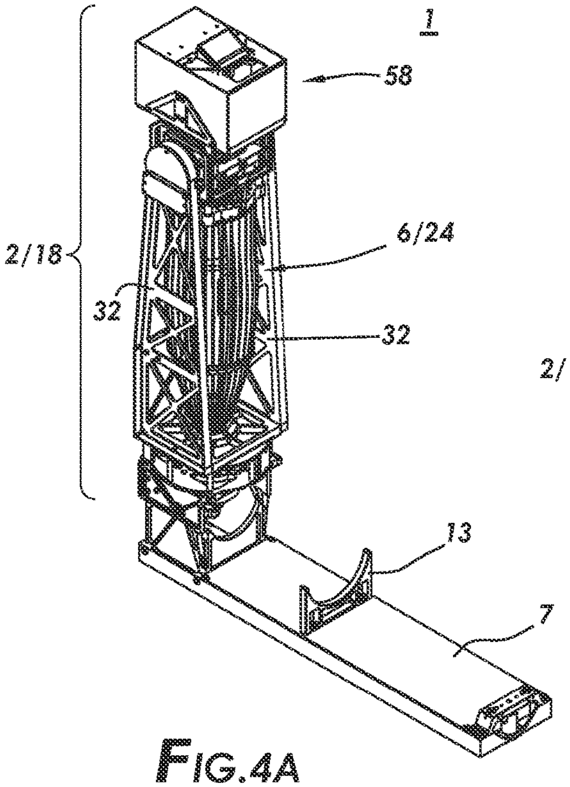
FIG. 4A is a perspective view of the pivoting and/or rotating of the particular embodiment of the antenna system shown in FIGS. 3A through 3G toward a deployed configuration.
Figure 4B:
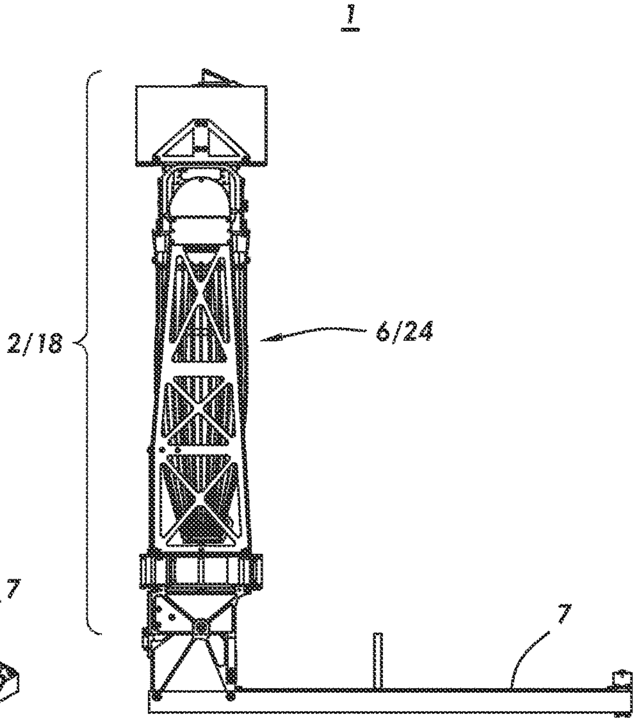
FIG. 4B is a front view of the particular embodiment of the antenna system shown in FIG. 4A.
Figure 4C:
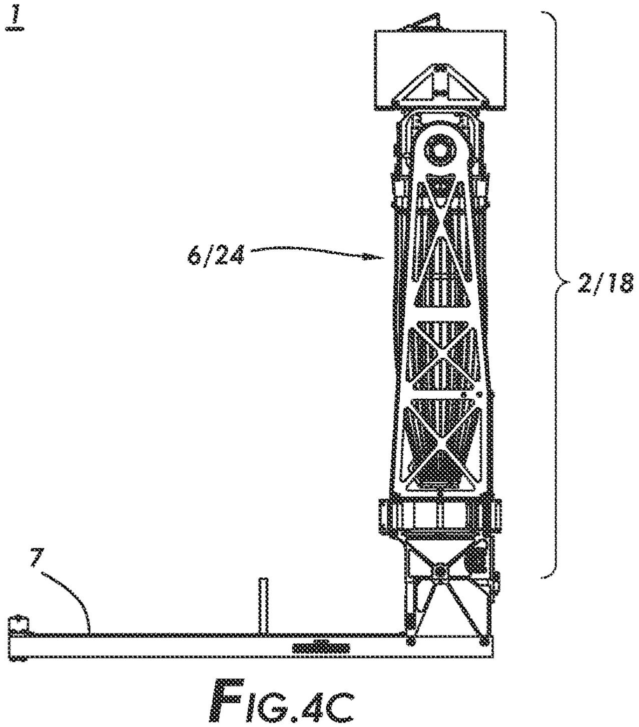
FIG. 4C is a rear view of the particular embodiment of the antenna system shown in FIG. 4A.
Figure 4D:
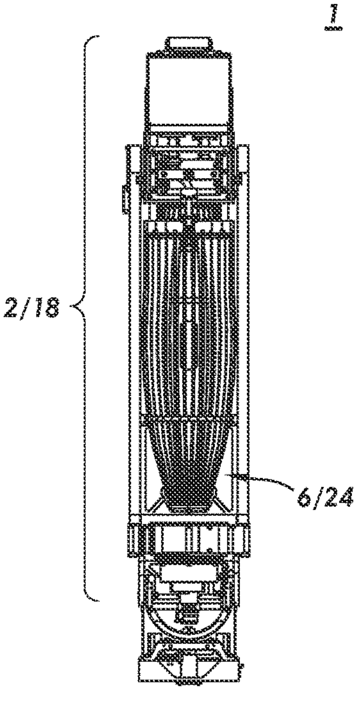
FIG. 4D is a first side view of the particular embodiment of the antenna system shown in FIG. 4A.
Figure 4F:
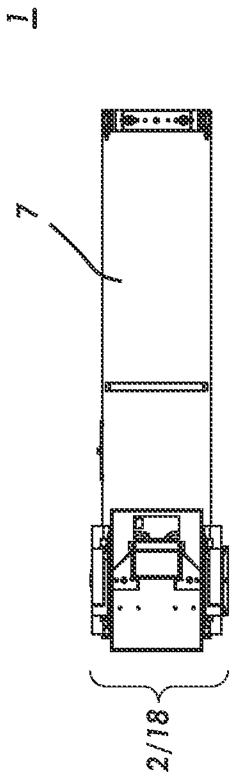
FIG. 4F is a top view of the particular embodiment of the antenna system shown in FIG. 4A.
Figure 4G:
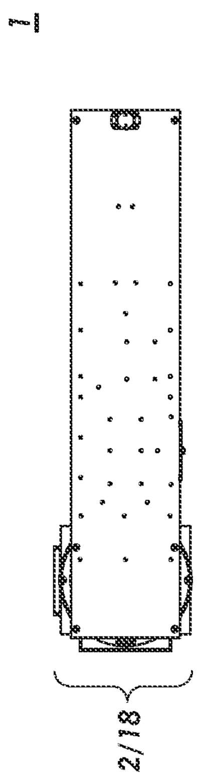
FIG. 4G is a bottom view of the particular embodiment of the antenna system shown in FIG. 4A.
Figure 4E:
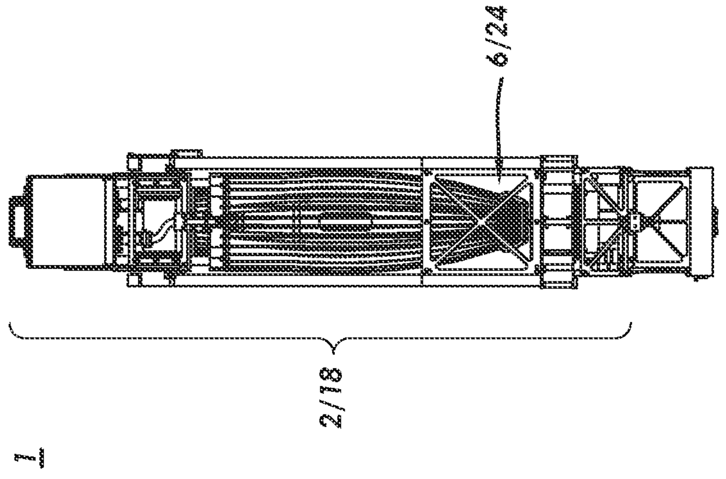
FIG. 4E is a second side view of the particular embodiment of the antenna system shown in FIG. 4A.
Figure 5A:
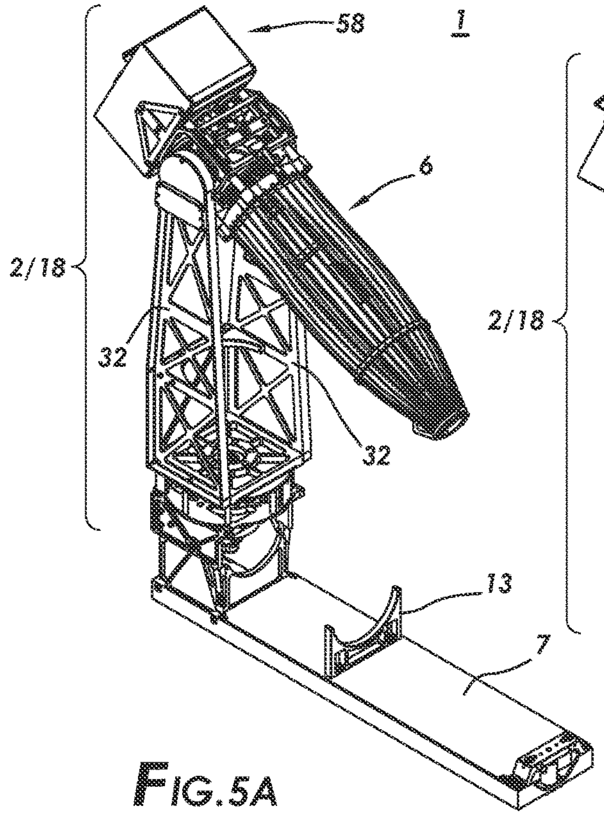
FIG. 5A is a perspective view of the pivoting and/or rotating of the particular embodiment of the antenna system shown in FIGS. 4A through 4G toward the deployed configuration.
Figure 5B:
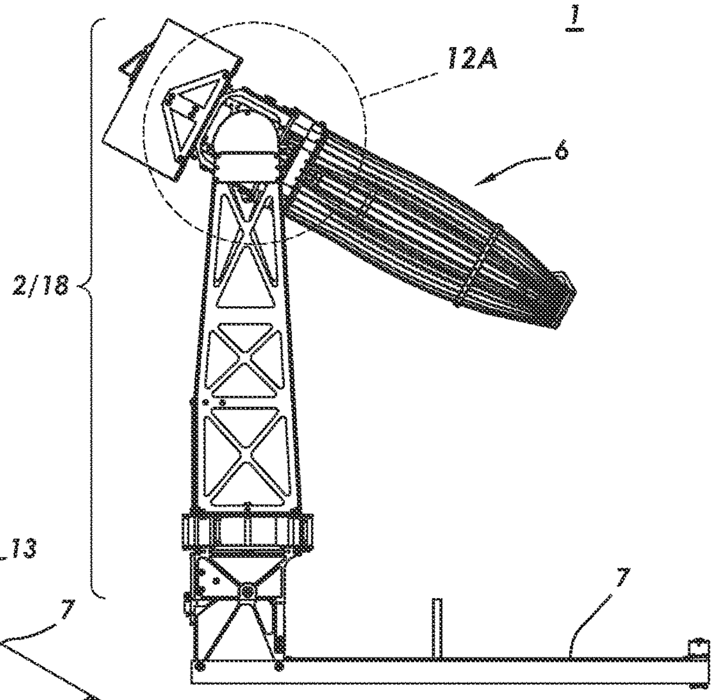
FIG. 5B is a front view of the particular embodiment of the antenna system shown in FIG. 5A.
Figure 5C:
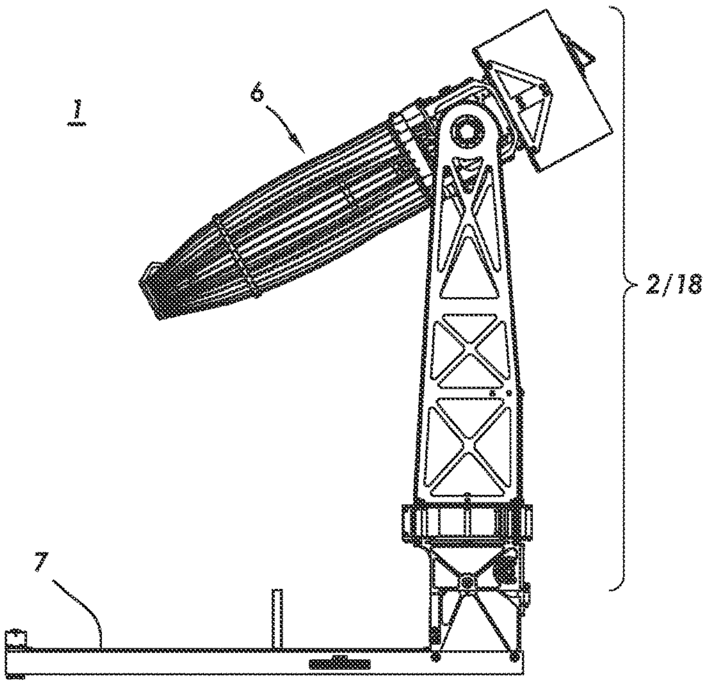
FIG. 5C is a rear view of the particular embodiment of the antenna system shown in FIG. 5A.
Figure 5D:
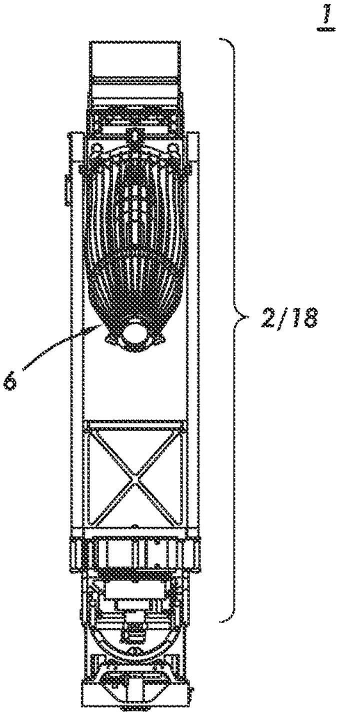
FIG. 5D is a first side view of the particular embodiment of the antenna system shown in FIG. 5A.
Figure 5F:
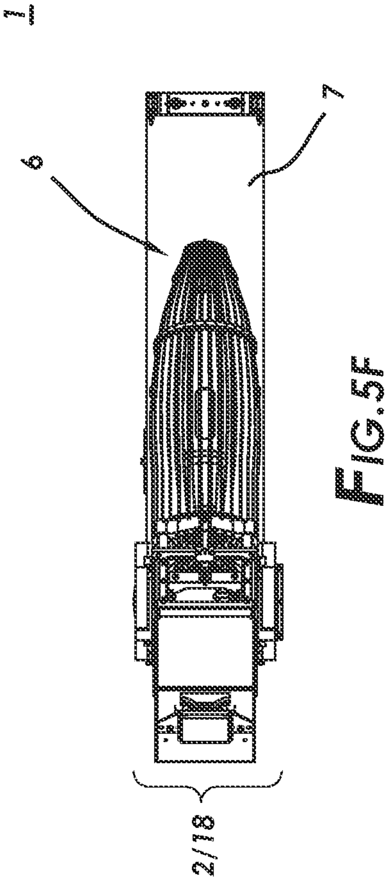
FIG. 5F is a top view of the particular embodiment of the antenna system shown in FIG. 5A.
Figure 5G:
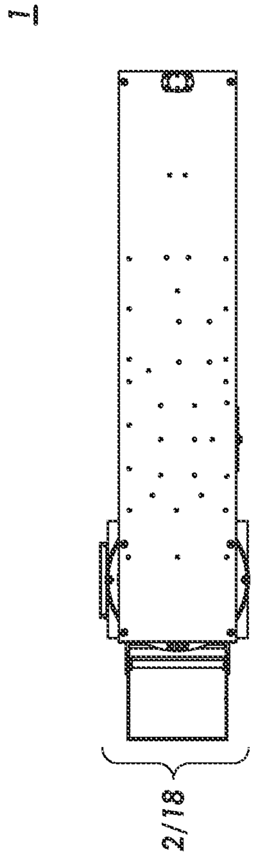
FIG. 5G is a bottom view of the particular embodiment of the antenna system shown in FIG. 5A.
Figure 5E:
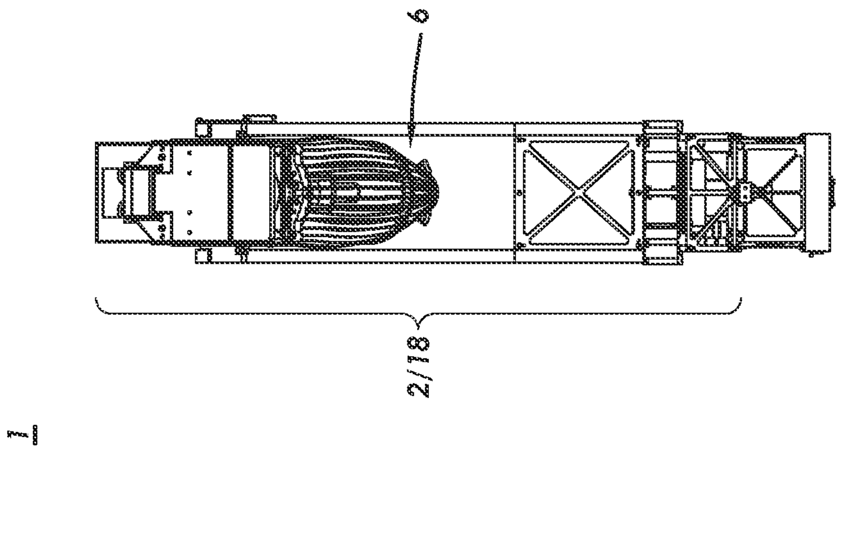
FIG. 5E is a second side view of the particular embodiment of the antenna system shown in FIG. 5A.
Figure 6A:
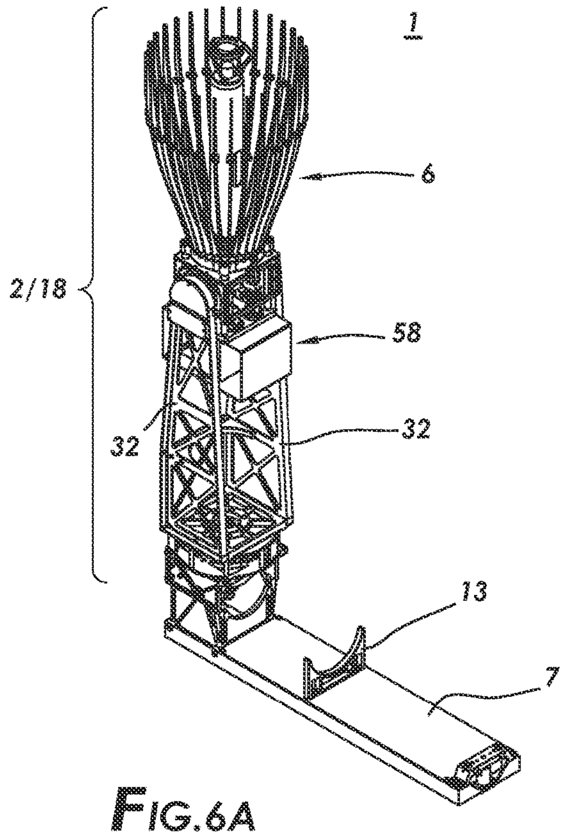
FIG. 6A is a perspective view of the pivoting and/or rotating of the particular embodiment of the antenna system shown in FIGS. 5A through 5G toward the deployed configuration.
Figure 6B:
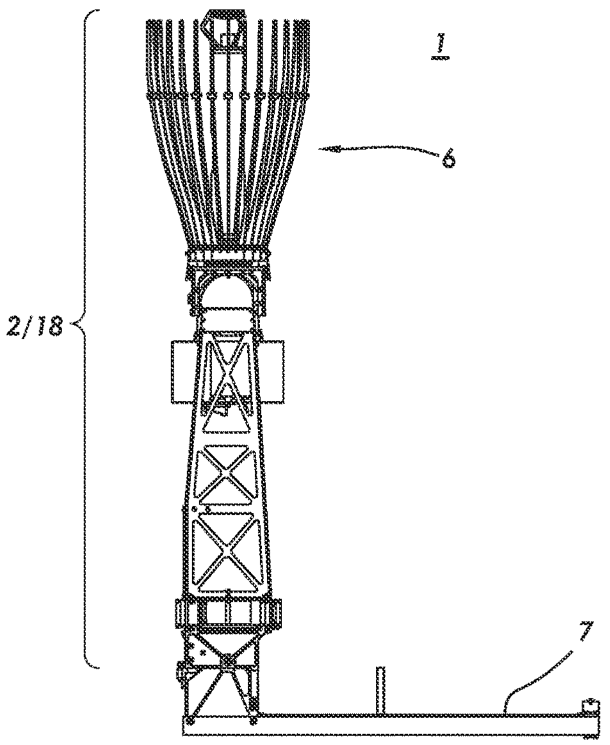
FIG. 6B is a front view of the particular embodiment of the antenna system shown in FIG. 6A.
Figure 6C:
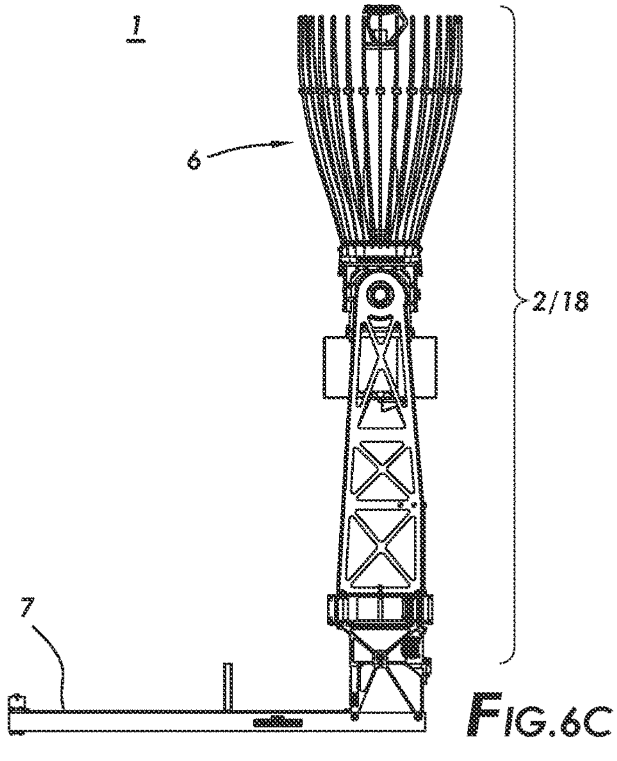
FIG. 6C is a rear view of the particular embodiment of the antenna system shown in FIG. 6A.
Figure 6D:
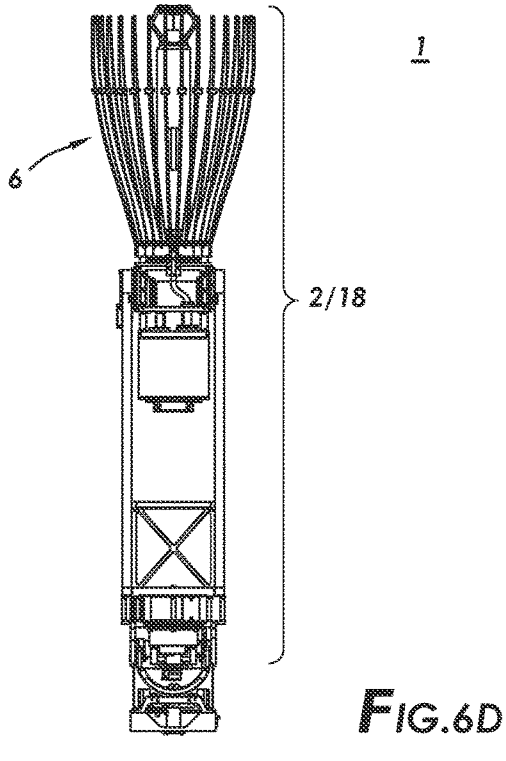
FIG. 6D is a first side view of the particular embodiment of the antenna system shown in FIG. 6A.
Figure 6F:
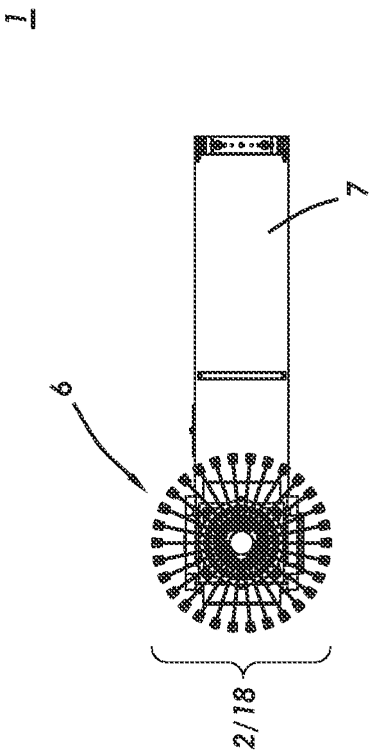
FIG. 6F is a top view of the particular embodiment of the antenna system shown in FIG. 6A.
Figure 6G:
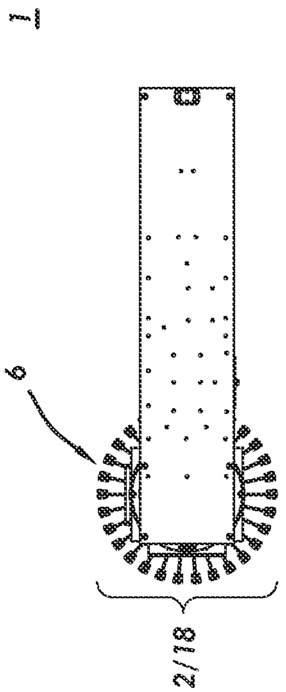
FIG. 6G is a bottom view of the particular embodiment of the antenna system shown in FIG. 6A.
Figure 6E:
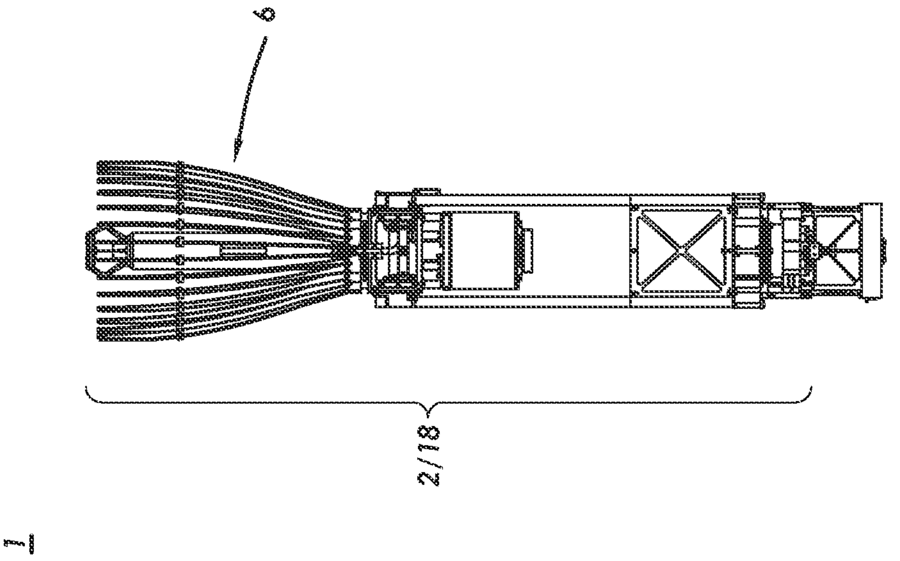
FIG. 6E is a second side view of the particular embodiment of the antenna system shown in FIG. 6A.
Figure 7A:
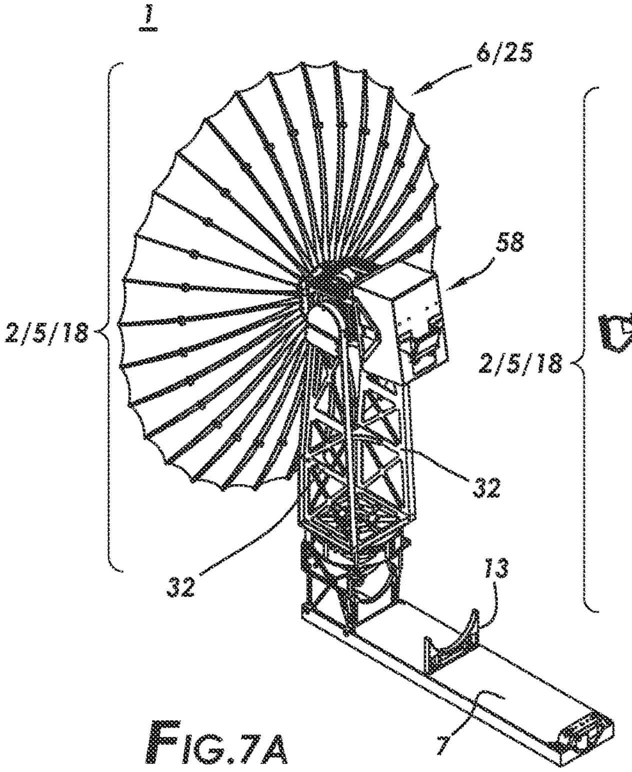
FIG. 7A is a perspective view of the particular embodiment of the antenna system shown in FIGS. 6A through 6G, whereby the antenna disposes in the deployed configuration.
Figure 7B:
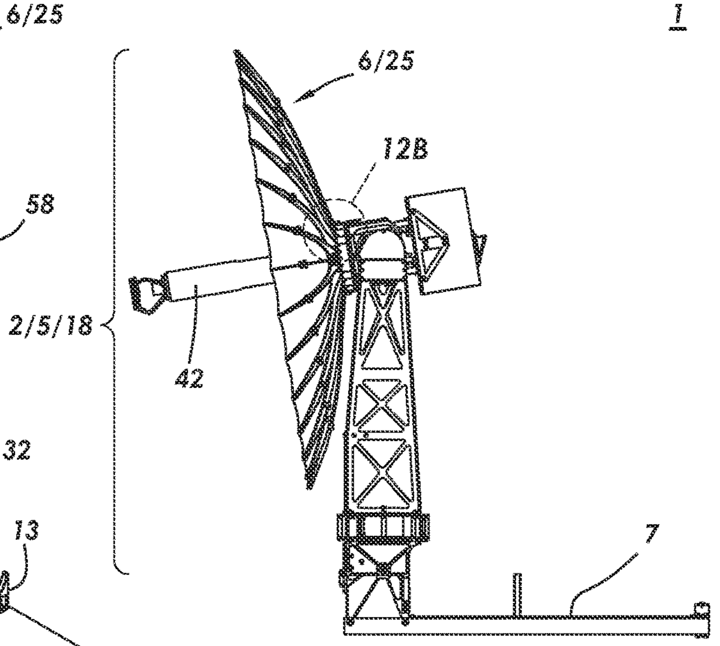
FIG. 7B is a front view of the particular embodiment of the antenna system shown in FIG. 7A.
Figure 7C:
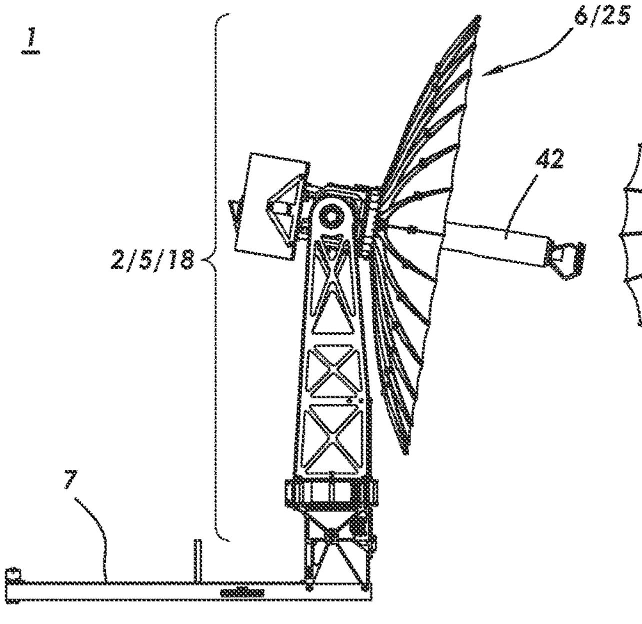
FIG. 7C is a rear view of the particular embodiment of the antenna system shown in FIG. 7A.
Figure 7D:
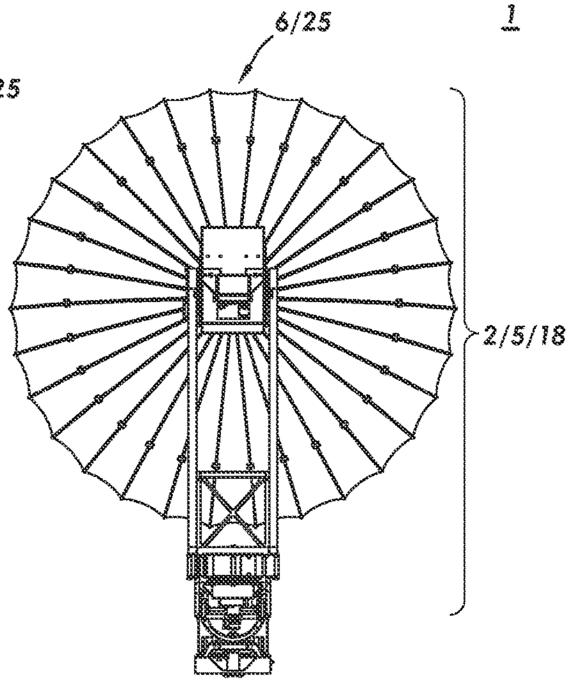
FIG. 7D is a first side view of the particular embodiment of the antenna system shown in FIG. 7A.
Figure 7F:
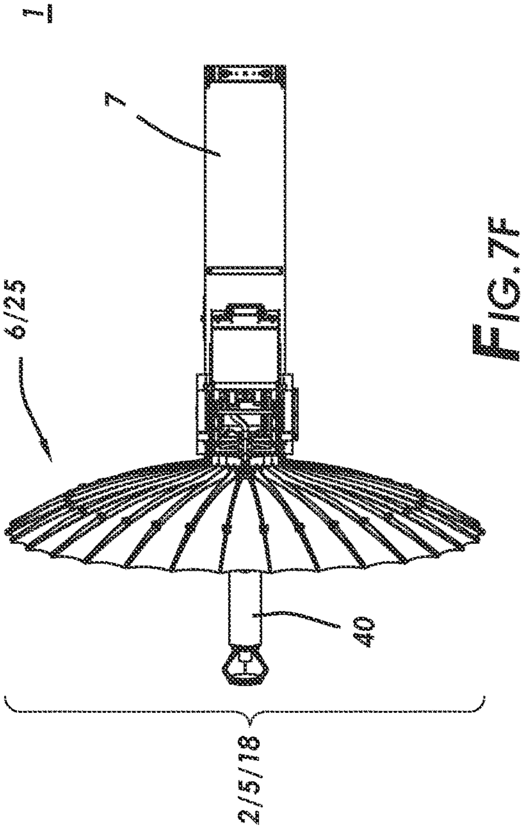
FIG. 7F is a top view of the particular embodiment of the antenna system shown in FIG. 7A.
Figure 7G:
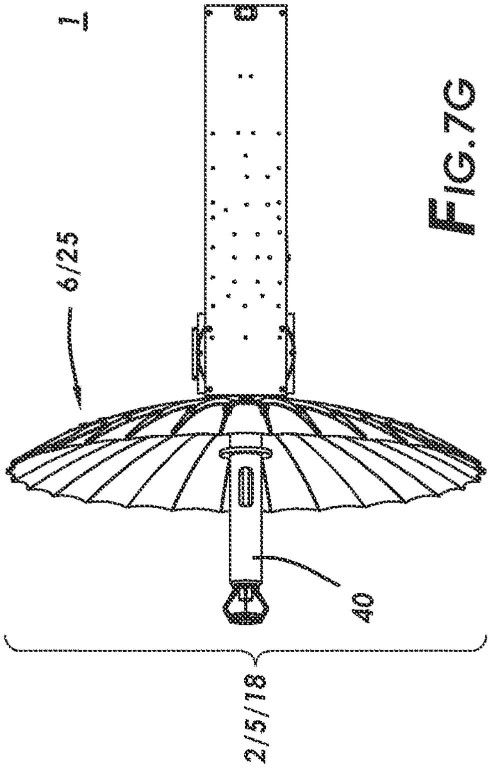
FIG. 7G is a bottom view of the particular embodiment of the antenna system shown in FIG. 7A.
Figure 7E:
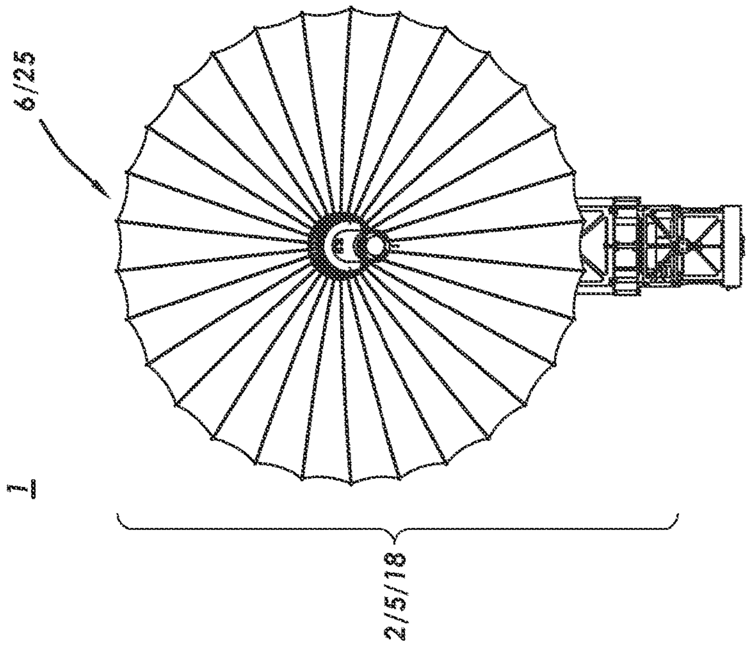
FIG. 7E is a second side view of the particular embodiment of the antenna system shown in FIG. 7A.

Now referring primarily to FIGS. 1A through 2D, which illustrate an embodiment of an antenna system (1) including a deployable antenna (2) disposable in (i) a stowed configuration (3) (as shown in the example of FIG. 1A) for stowage in a compact volume and/or within a container (4) (as shown in the example of FIG. 2A), and (ii) a deployed configuration (5) (as shown in the examples of FIGS. 1E and 1F) in which the antenna (2) is deployed from the compact volume and/or from within the container (4) (as shown in the examples of FIGS. 2C and 2D) and can correspondingly interact with a remote target over a distance for applications such as communication, sensor and/or sensing, detection and/or detecting, tracking, radar, dithering, and/or the like. Significantly, when in the deployed configuration (5), a reflector (6) of the antenna (2) can be directionally adjustable.

As to particular embodiments, the instant antenna system (1) can be used in a satellite application whereby, as used herein, the term "satellite" can mean an object intended to move relative to or orbit another object. As to particular embodiments, the term "satellite" can refer to a machine intended to be launched into space to move around Earth or another celestial body.

As to particular embodiments, the satellite may be a relatively small spacecraft and accordingly, may be considered a SmallSat. As to particular embodiments, the satellite may be a Minisatellite, a Microsatellite, a Nanosatellite, a Picosatellite, or a Femtosatellite.

As to particular embodiments, the satellite may be configured as a CubeSat (U-class spacecraft), the "CubeSat" designation meaning a small satellite which conforms to specific criteria that control factors such as its shape, size, and weight, whereby the standardized dimensions allow efficient stacking and launching of the CubeSat into space. Additional information regarding CubeSats can be found in CubeSat101 published by the National Aeronautics and Space Administration (NASA), Revision Dated October 2017, which is hereby incorporated by reference herein in its entirety.

As to particular embodiments, prior to deployment, the stowed configuration (3) of the antenna (2) can occupy a compact volume. Correspondingly, the antenna system (1) can include a deployer configured to deploy the antenna (2) from the compact volume.

Now referring primarily to FIG. 2A, as to particular embodiments, prior to deployment, the stowed configuration (3) of the antenna (2) must fit within a confined space, such as within a container (4). Correspondingly, the antenna system (1) can include a deployer configured to deploy the antenna (2) from within the container (4) to dispose the reflector (6) in spaced-apart relation to the container (4) (as shown in the examples of FIGS. 2C and 2D).

Now referring primarily to FIGS. 3A through 4G, as to particular embodiments, the deployer can pivotally and/or rotatably deploy the antenna (2) from the compact volume and/or from within the container (4), whereby a pivotal connection between two bodies can allow the bodies to change positions relative to one another around or about at least one point (typically a pivot point) and a rotatable connection between two bodies can allow the movement of the bodies relative to one another around or about an axis. Following, the antenna (2) can be pivotally and/or rotatably coupled to a surface (7). As to particular embodiments, the antenna (2) can be pivotally and/or rotatably coupled to the container (4) and more specifically, to a surface (7) associated with the container (4), whereby the surface (7) may be (i) integrated with or (ii) discrete from the container (4), depending upon the embodiment.

In addition to being pivotally and/or rotatably coupled to the surface (7) (for example, proximate one portion, such as an end), the antenna (2) can also be releasably coupled to the surface (7) (for example, proximate a second portion, such as the opposing end), whereby the releasable coupling may facilitate retention of the antenna (2) in the stowed configuration (3) prior to deployment. As to particular embodiments, the antenna (2) can be releasably coupled to the surface (7) by a releasable retention element (8) which can firstly retain the antenna (2) in the stowed configuration (3) and secondly, upon actuation, release the antenna (2) such that the releasably coupled portion of the antenna (2) can uncouple from the surface (7) and subsequently, the antenna (2) can pivot and/or rotate toward the deployed configuration (5).

Now referring primarily to FIGS. 3A through 3G, and FIG. 9, as but one illustrative example, the retention element (8) can be configured as a frangible bolt (or a frangibolt or a FRANGIBOLT®) which upon actuation (such as by a frangible bolt actuator (9)), can break (for example, proximate a separation groove (10)) and correspondingly release the releasably coupled portion of the antenna (2) from the surface (7).

Now referring primarily to FIGS. 3A through 3G, and FIG. 10, when the antenna (2) disposes in the stowed configuration (3), the ribs (11) of the antenna (2) can correspondingly dispose in a collapsed configuration (12) and can be supported by one or more cradle elements, for example separable cradle elements (13), which can dispose about the ribs (11). As to particular embodiments, a chock (14) can be coupled to each rib (11), the chocks (14) together forming a compression ring when the antenna (2) disposes in the stowed configuration (3), whereby the compression ring may facilitate the distribution of load(s) and/or the reaction to load(s) during launch and/or flight. Additionally, each chock (14) can engage with a cradle element (13) to support the ribs (11) when the antenna (2) disposes in the stowed configuration (3).

Figure 11A:
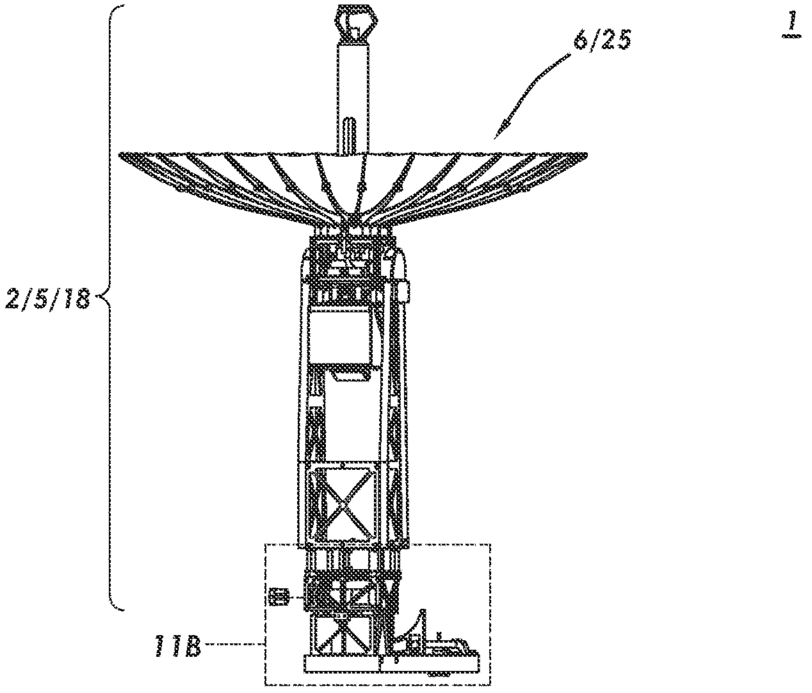
FIG. 11A is a perspective view of a particular embodiment of the instant antenna system including an antenna disposed in a deployed configuration, whereby the mount is shown exploded from the first motor.

For deployment, the antenna (2) can be (i) released from the surface (7) and can pivot and/or rotate toward the deployed configuration (5), whereby the pivoting and/or rotating of the antenna (2) can be passively actuated or actively actuated, depending upon the embodiment. Now referring primarily to FIGS. 11A and 11B, regarding the latter, the antenna (2) can be driven toward the deployed configuration (5) by a first driver (15) (such as a first motor) which can facilitate pivoting and/or rotating of the antenna (2) about a first axis (16) (such as via a gear system) from a first orientation (17) (as shown in the examples of FIGS. 3A through 3G) to, for example, up to 90° (as shown in the examples of FIGS. 4A through 4G) or even up to 180° (or beyond) relative to the first orientation (17) to dispose the antenna (2) in a second orientation (18).

Figure 11B:
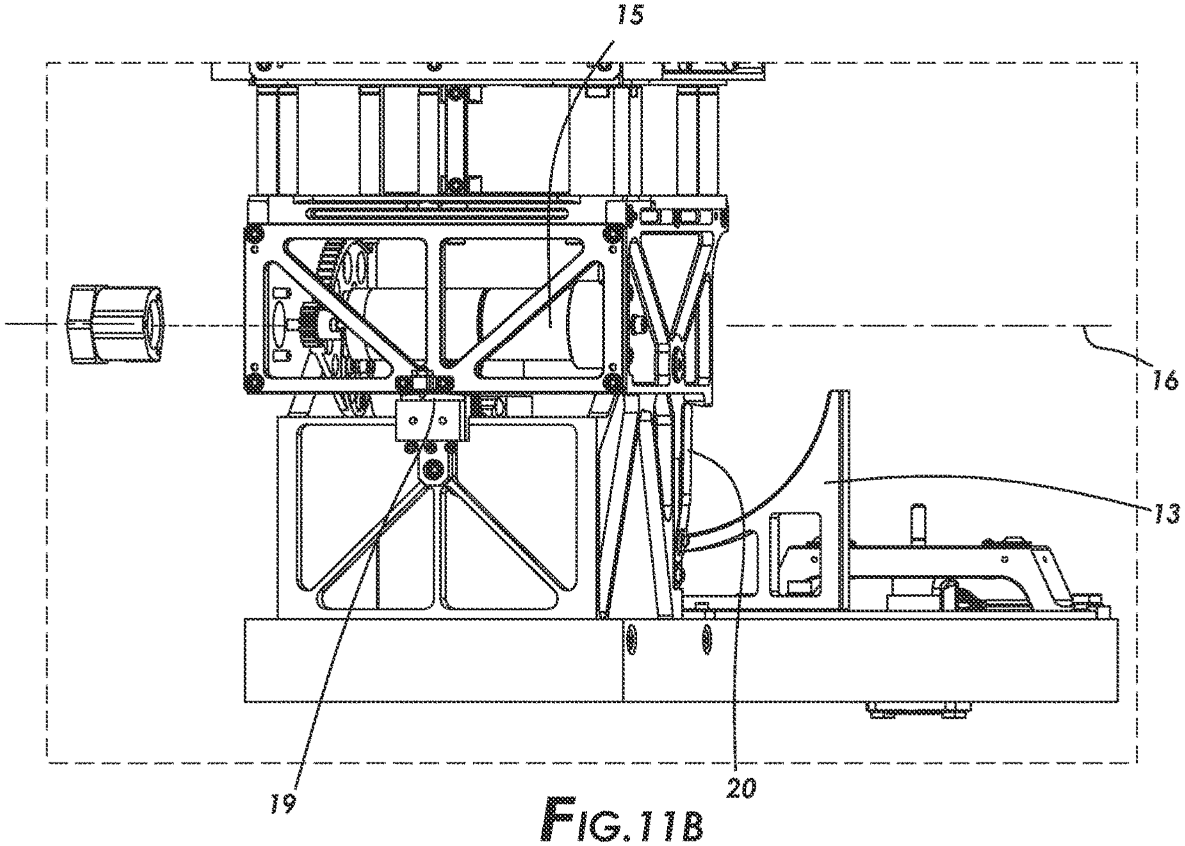
FIG. 11B is an enlarged view of a portion of the antenna system shown in FIG. 11A.

Now referring primarily to FIG. 11B, upon pivoting and/or rotating to the second orientation (18), further pivotal and/or rotational travel of the antenna (2) can be precluded by a first stop element (19) (which, as an illustrative example, may be partially or entirely coupled to the surface (7) for abutting engagement with a portion of the antenna (2)), and the desired orientation can be retained by a first lock element (20) (which, as an illustrative example, may be partially or entirely coupled to the surface (7) for abutting engagement with a portion of the antenna (2)) to effectively secure the antenna (2) in the second orientation (18).

When the antenna (2) disposes in the first and second orientations (17)(18), the ribs (11) of the reflector (6) can dispose in the collapsed configuration (12) (as shown in the examples of FIGS. 3A through 4G), whereby this collapsed configuration (12) can be retained by a second lock element (21).

Figure 12A:
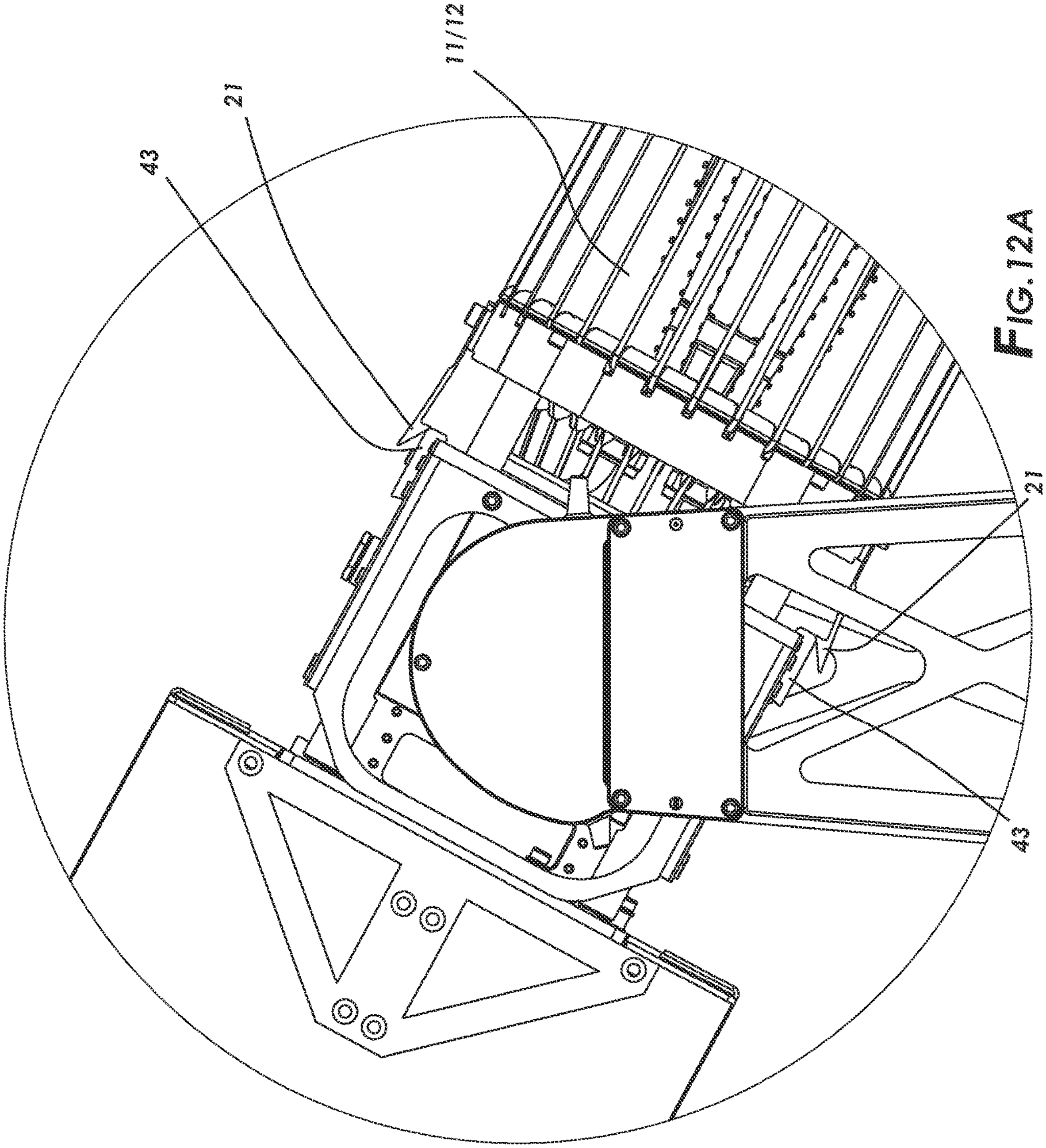
FIG. 12A is an enlarged view of a portion of the antenna system shown in FIG. 5B.
Figure 24B:
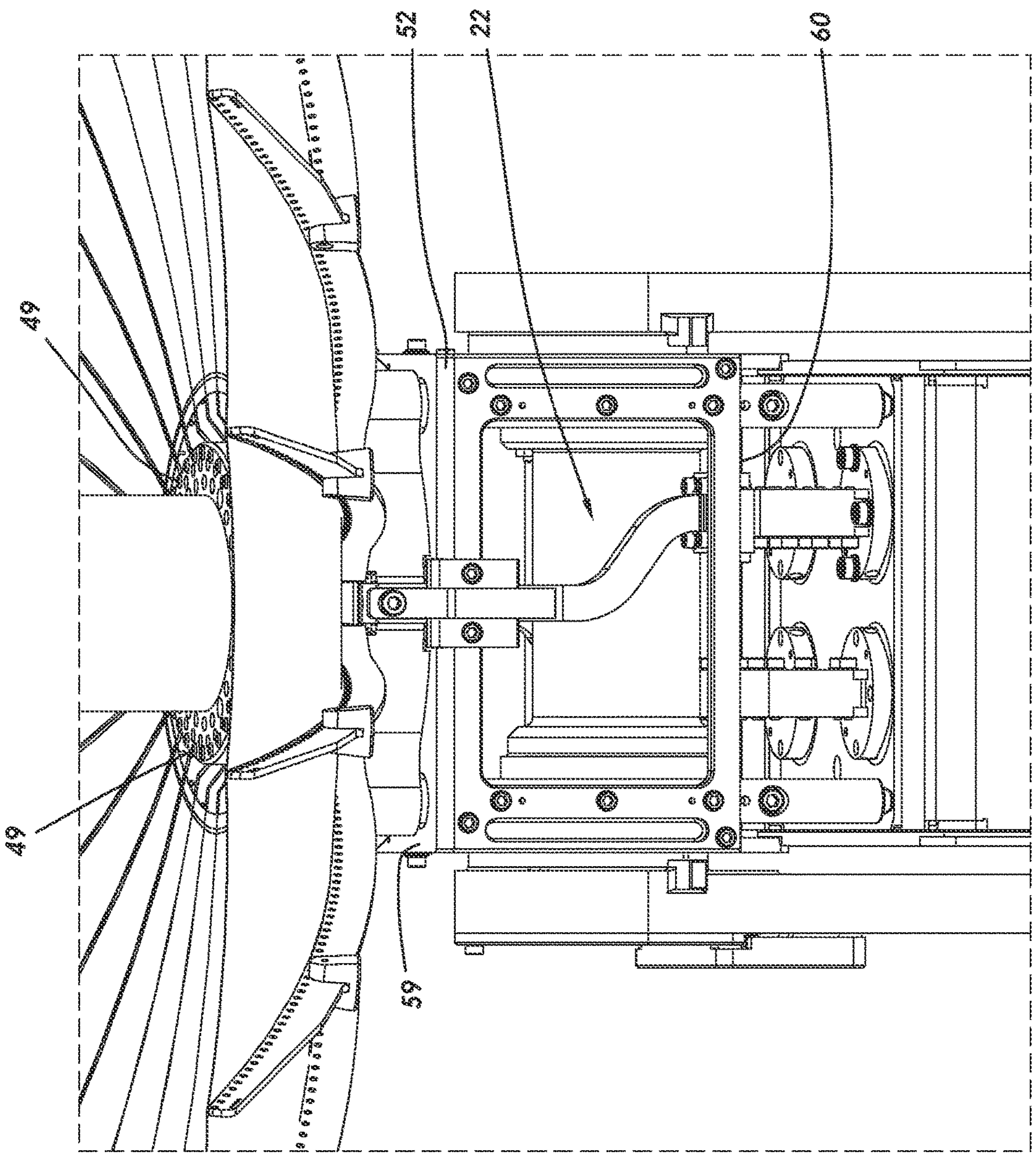
FIG. 24B is an enlarged view of a portion of the antenna system shown in FIG. 24A.
Figure 24A:
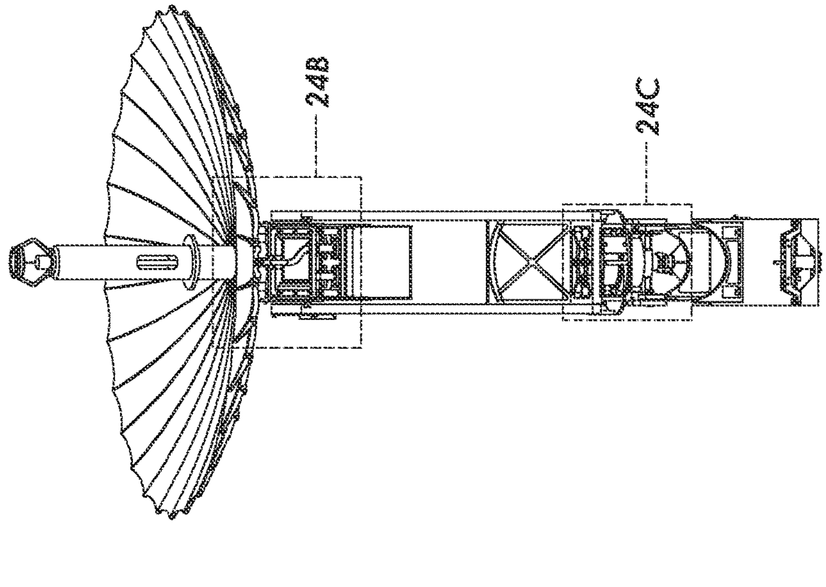
FIG. 24A is another perspective view of the particular embodiment of the antenna system shown in FIG. 23.
Figure 24C:
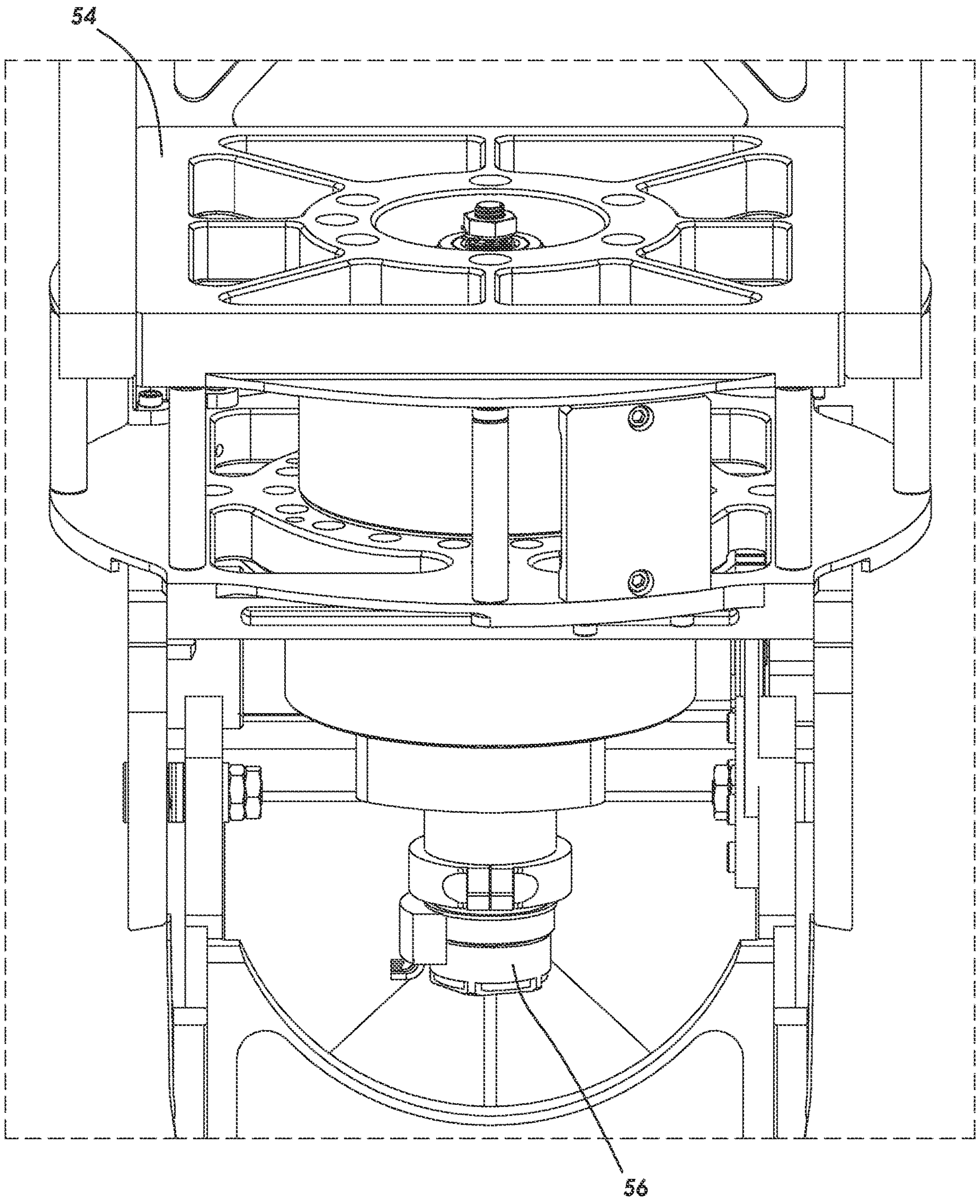
FIG. 24C is an enlarged view of a portion of the antenna system shown in FIG. 24A.
Figure 25:
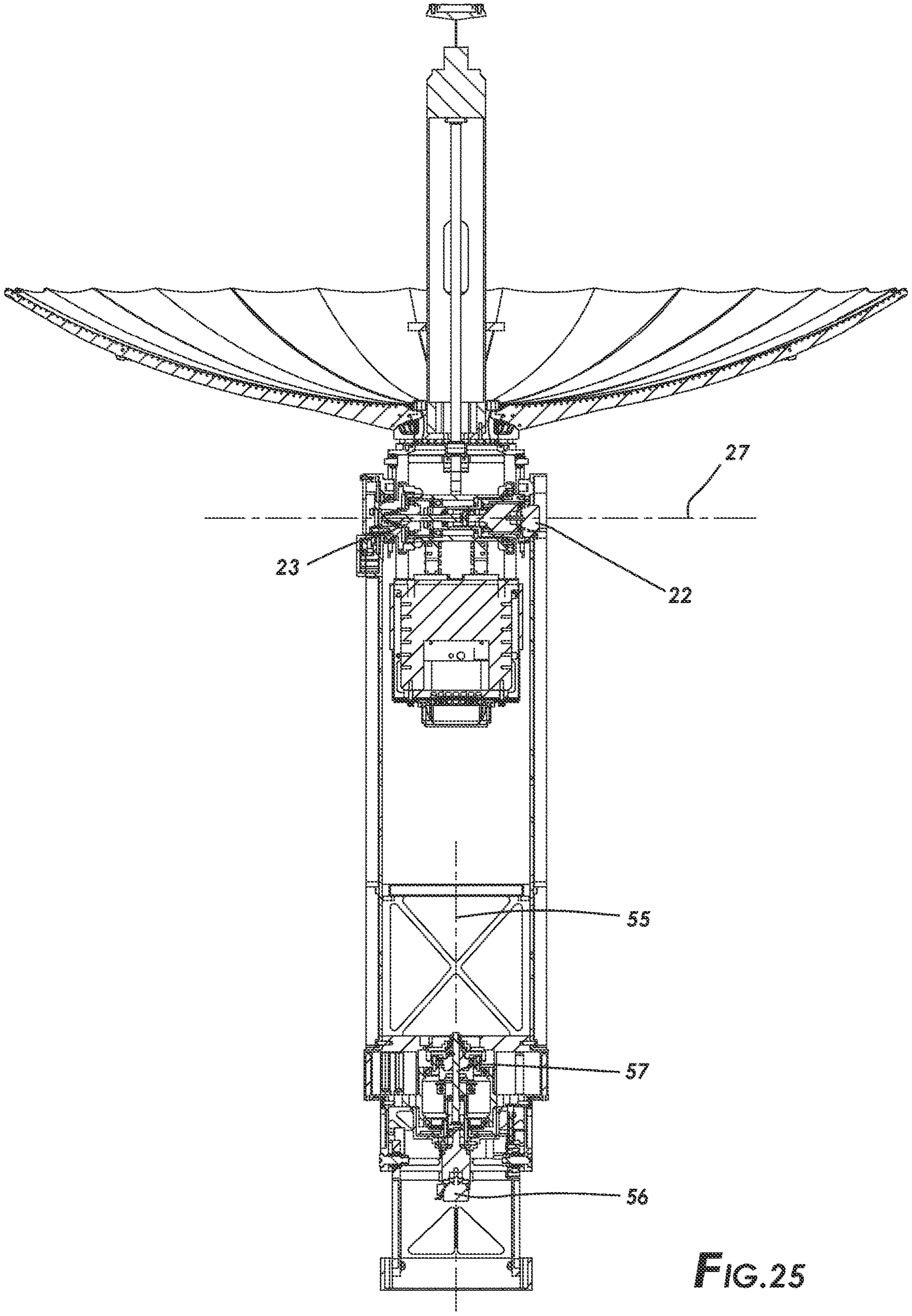
FIG. 25 is a cross-sectional view of the particular embodiment of the antenna system shown in FIG. 8B along 25-25.

Subsequently, the reflector (6) can be driven by a second driver (22) (such as a second motor operatively coupled to a drive shaft (23), as shown in the examples of FIGS. 24A, 24B, and 25) from its 0° first position (24) (as shown in the examples of FIGS. 4A through 4G) along a travel path (26), whereby the second driver (22) can facilitate pivoting and/or rotating of the reflector (6) about a second axis (27) toward a second position (25) (for example, up to 280°) to facilitate extension of the ribs (11) toward an extended configuration (28) (as shown in the examples of FIGS. 7A through 8G). Now referring primarily to FIG. 12A, as to particular embodiments, during pivotal and/or rotational movement of the reflector (6), the ribs (11) can continue to remain in the collapsed configuration (12) via the second lock element (21) for a portion of the travel path (26).

As to particular embodiments, the antenna (2) can include a drivable member (29) to which the reflector (6) can be attached, whereby the drivable member (29) and correspondingly the reflector (6) can be driven by the second driver (22) to pivot and/or rotate about the second axis (27) to extend the ribs (11) toward the extended configuration (28).

Now referring primarily to FIGS. 13A through 18B, as to particular embodiments, the drivable member (29) can include a follower (30) which can engage with a camming surface (31) during travel along the travel path (26).

Now referring primarily to FIGS. 13A through 13E, the camming surface (31) can be coupled to, directly coupled to, connected to, directly connected to, or integrated with a support (32) (which may be configured as an elongate member) to which the reflector (6) can be pivotally and/or rotatably coupled, whereby the second axis (27) can pass through the support (32) and the interior space (33) defined by the camming surface (31). As to particular embodiments, the camming surface (31) can be proximate the support's inner surface (34).

As to particular embodiments, the reflector (6) can be disposed between a pair of supports (32), each having a camming surface (31) coupled to its inner surface (34).

Figure 13D:
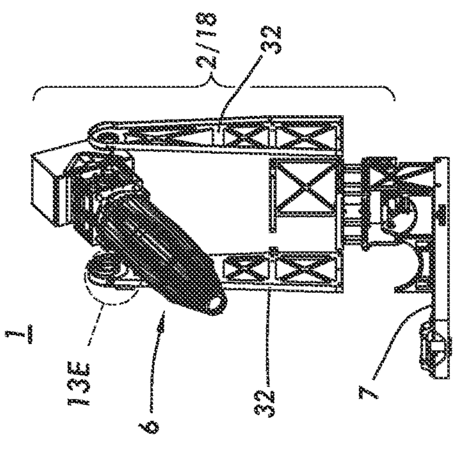
FIG. 13D is another perspective view of the particular embodiment of the antenna system shown in FIG. 13A.
Figure 13E:
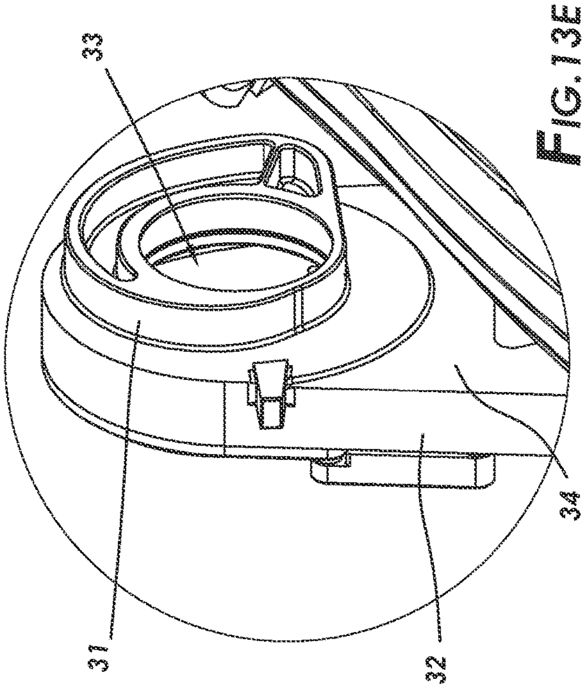
FIG. 13E is an enlarged view of a portion of the antenna system shown in FIG. 13D.
Figure 13A:
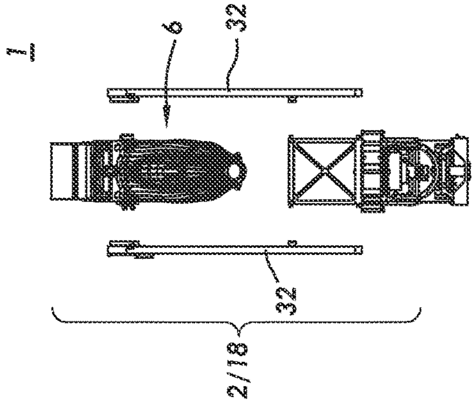
FIG. 13A is a first side view of the pivoting and/or rotating of a particular embodiment of the instant antenna system toward the deployed configuration, whereby the supports are shown exploded from the reflector.
Figure 13B:
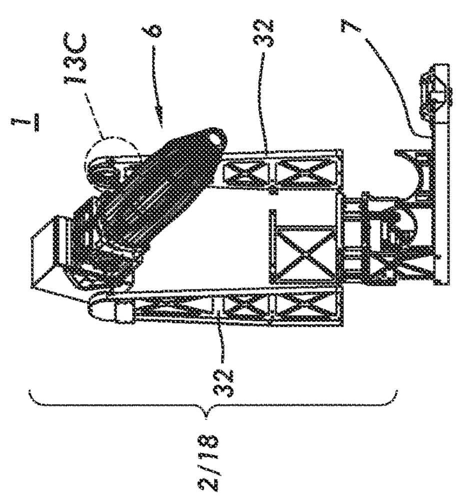
FIG. 13B is a perspective view of the particular embodiment of the antenna system shown in FIG. 13A.
Figure 13C:
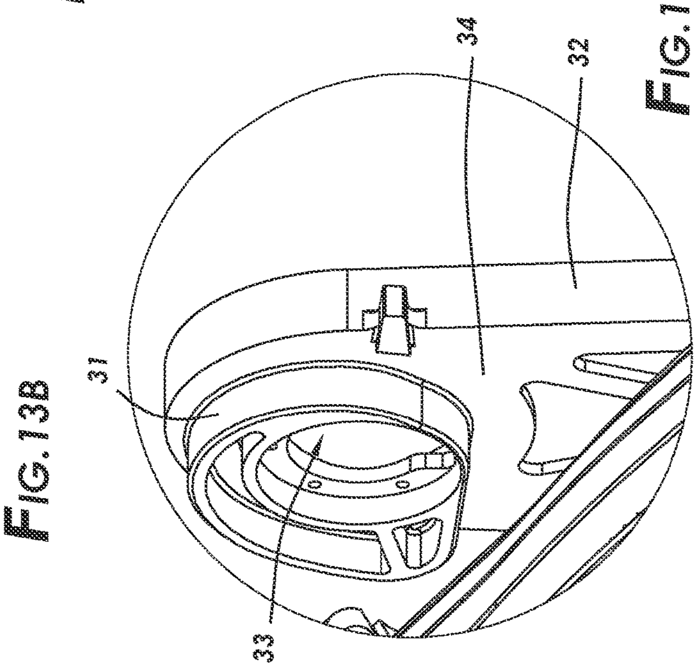
FIG. 13C is an enlarged view of a portion of the antenna system shown in FIG. 13B.
Figure 14B:
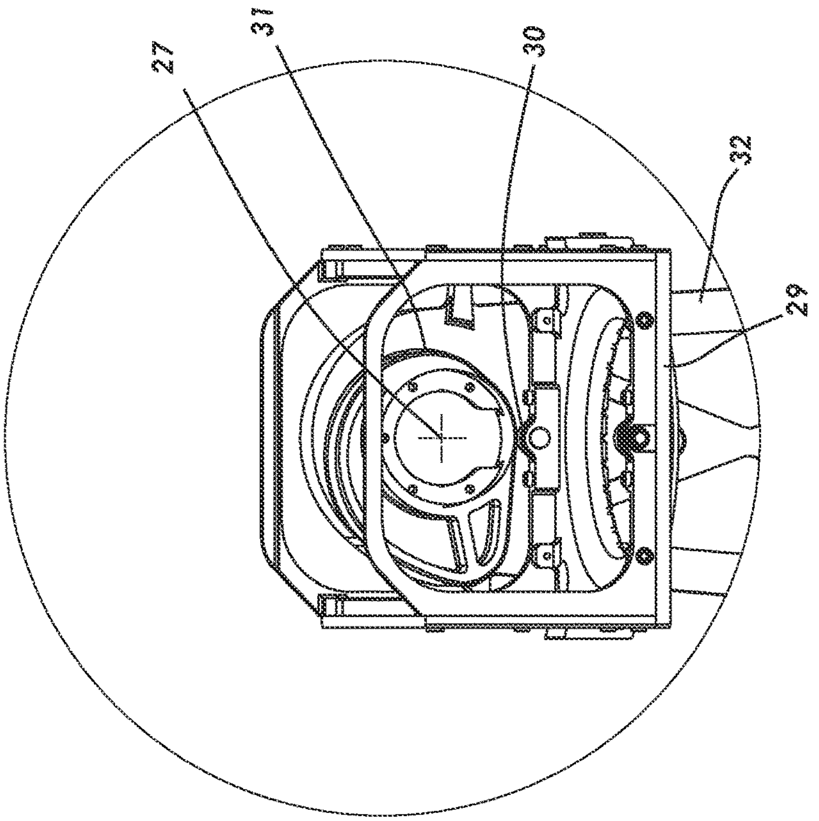
FIG. 14B is a perspective view of the particular embodiment of the follower and the camming surface shown in FIG. 14A.
Figure 14A:
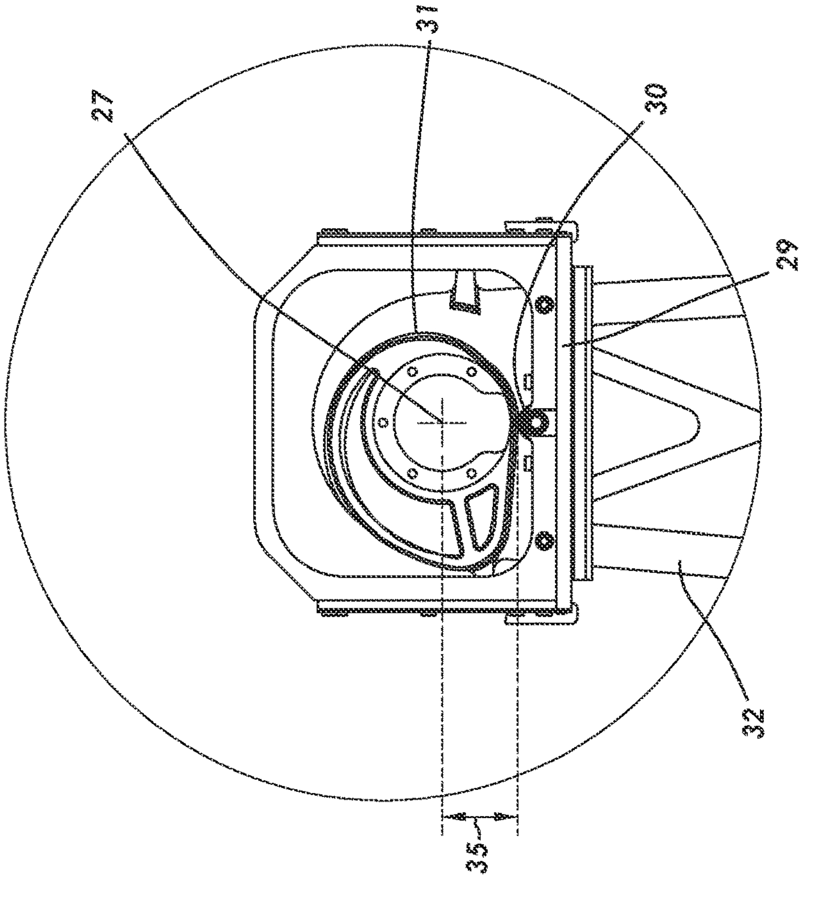
FIG. 14A is a front view of the particular embodiment of the antenna system shown in FIGS. 4A through 4G, illustrating the antenna's drivable member having one of its followers engaged with a camming surface.

Now referring primarily to FIGS. 13C and 13E, the camming surface (31) can be (i) arcuate and/or curved, and (ii) disposed at a variable distance from the second axis (27) which passes through the interior space (33) defined by the camming surface (31) such that the follower (30) and correspondingly the drivable member (29) and the reflector (6) dispose at a variable distance from the second axis (27) during travel along the travel path (26).

As an illustrative example of the disposition of the follower (30) (which may be configured as a bearing) relative to the second axis (27) during travel along the travel path (26), when the reflector (6) disposes in its 0° first position (24) and correspondingly the ribs (11) dispose in the collapsed configuration (12) (as shown in the example of FIGS. 4A through 4G, 14A, and 14B), the follower (30) can dispose a first distance (35) from the second axis (27).

Figure 15B:
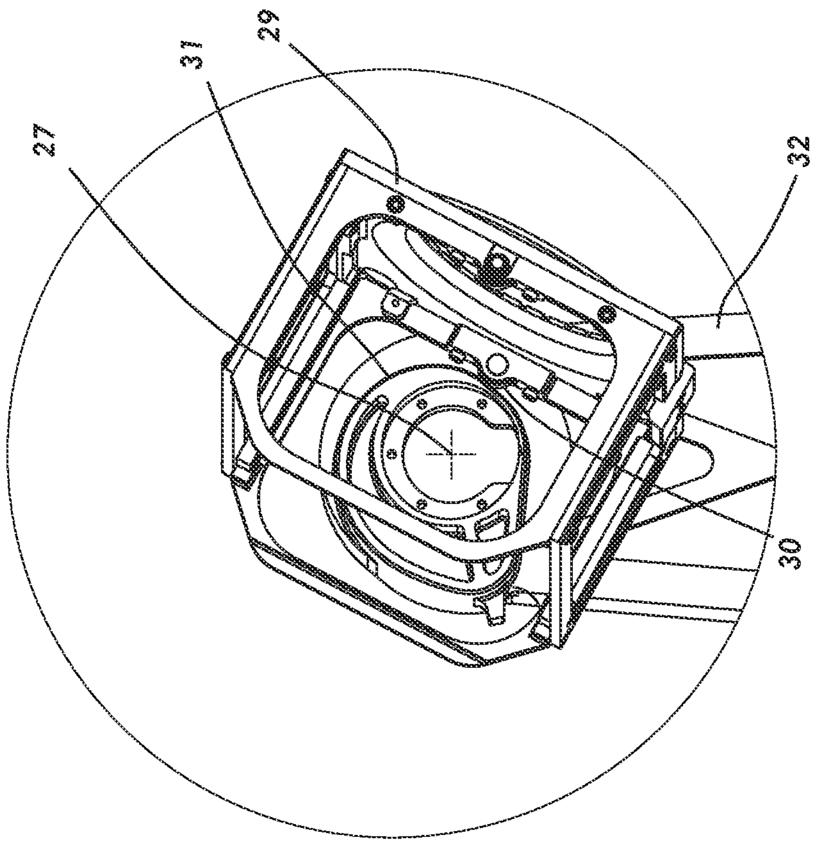
FIG. 15B is a perspective view of the particular embodiment of the follower and the camming surface shown in FIG. 15A.
Figure 15A:
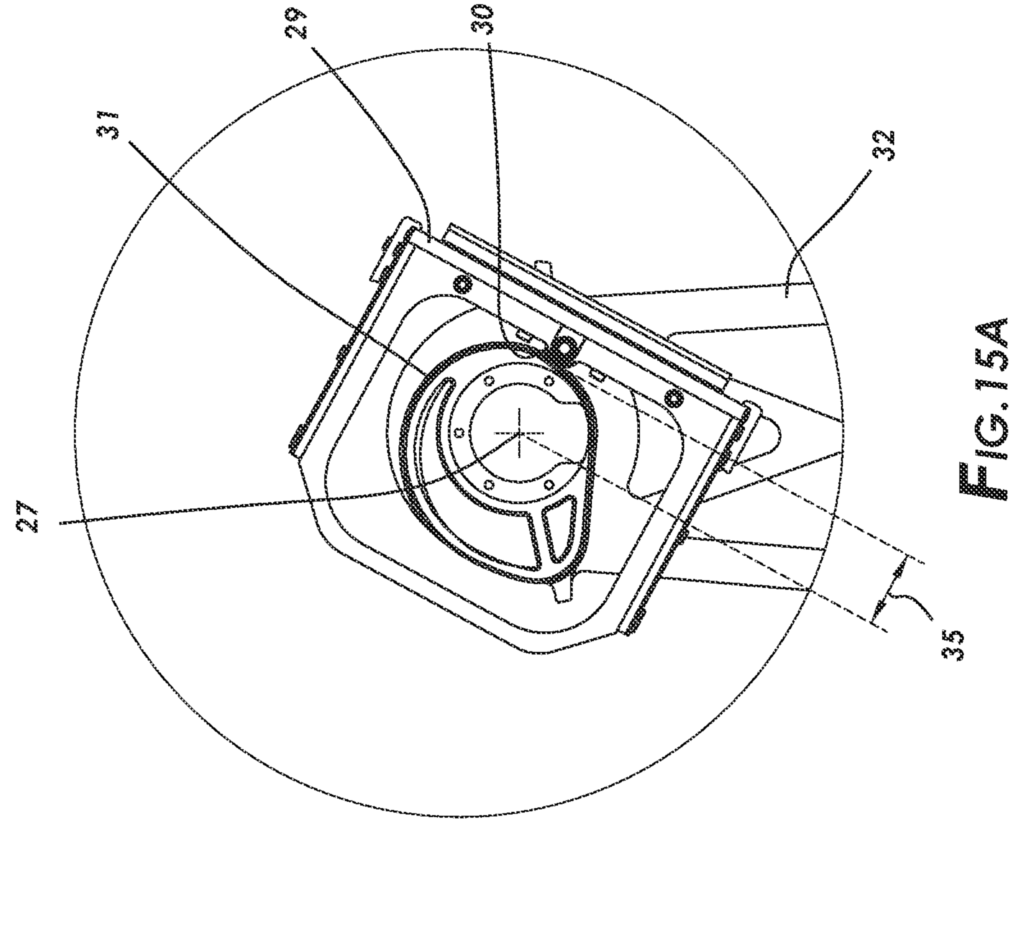
FIG. 15A is a front view of the particular embodiment of the antenna system shown in FIGS. 5A through 5G, illustrating the antenna's drivable member having one of its followers engaged with a camming surface.
Figure 16B:
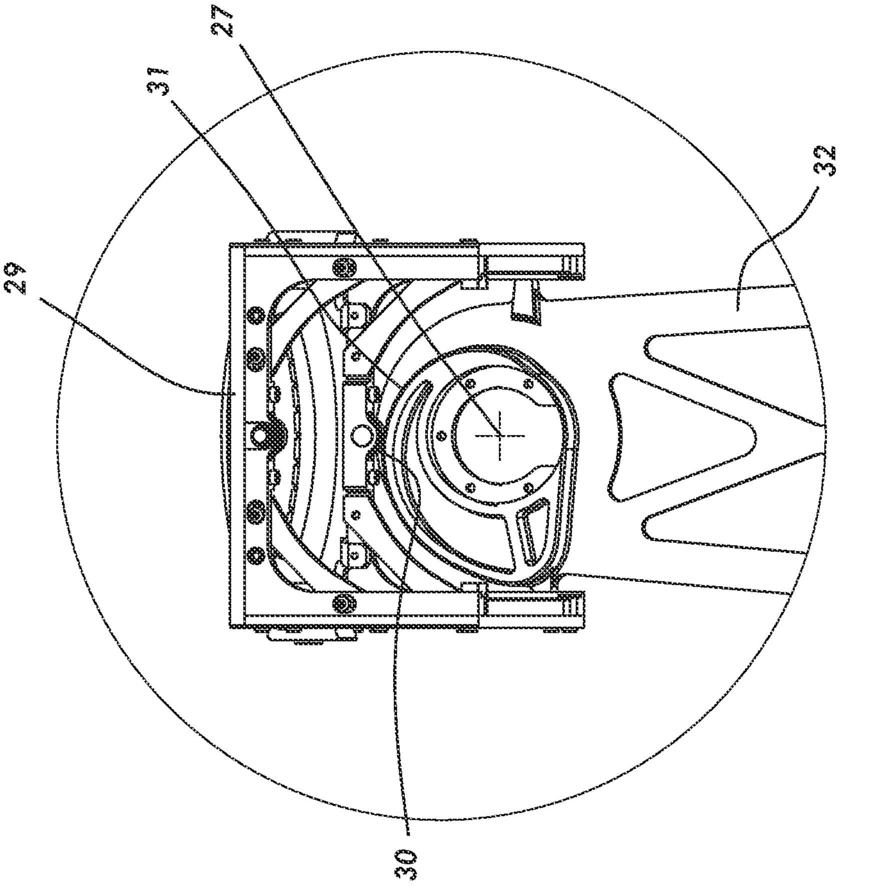
FIG. 16B is a perspective view of the particular embodiment of the follower and the camming surface shown in FIG. 16A.
Figure 16A:
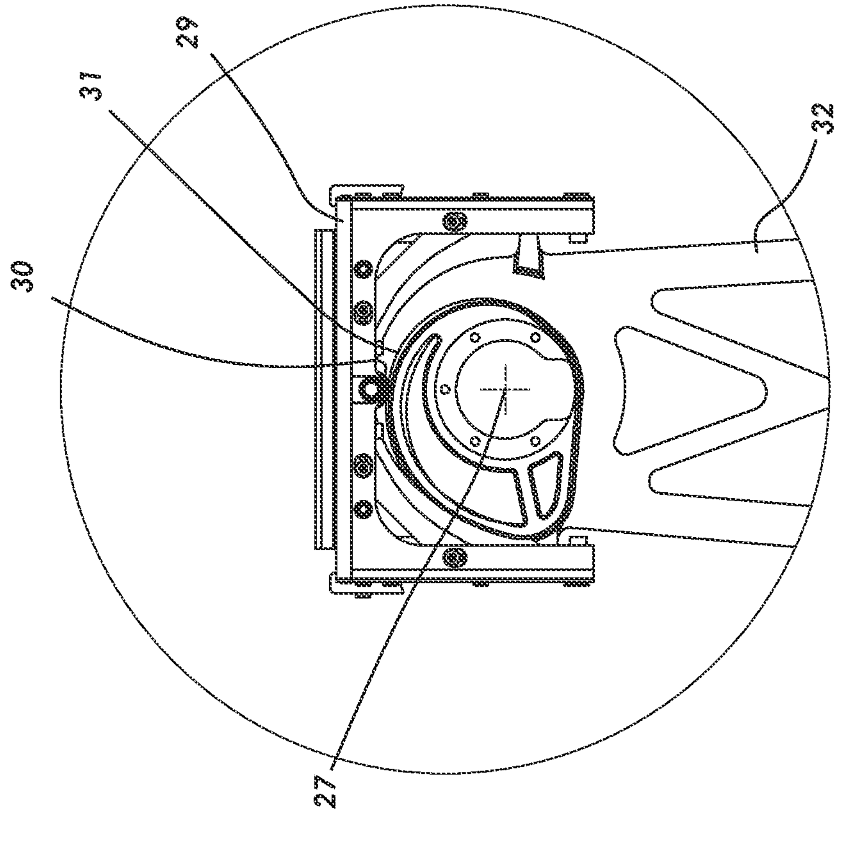
FIG. 16A is a front view of the particular embodiment of the antenna system shown in FIGS. 6A through 6G, illustrating the antenna's drivable member having one of its followers engaged with a camming surface.
Figure 17B:
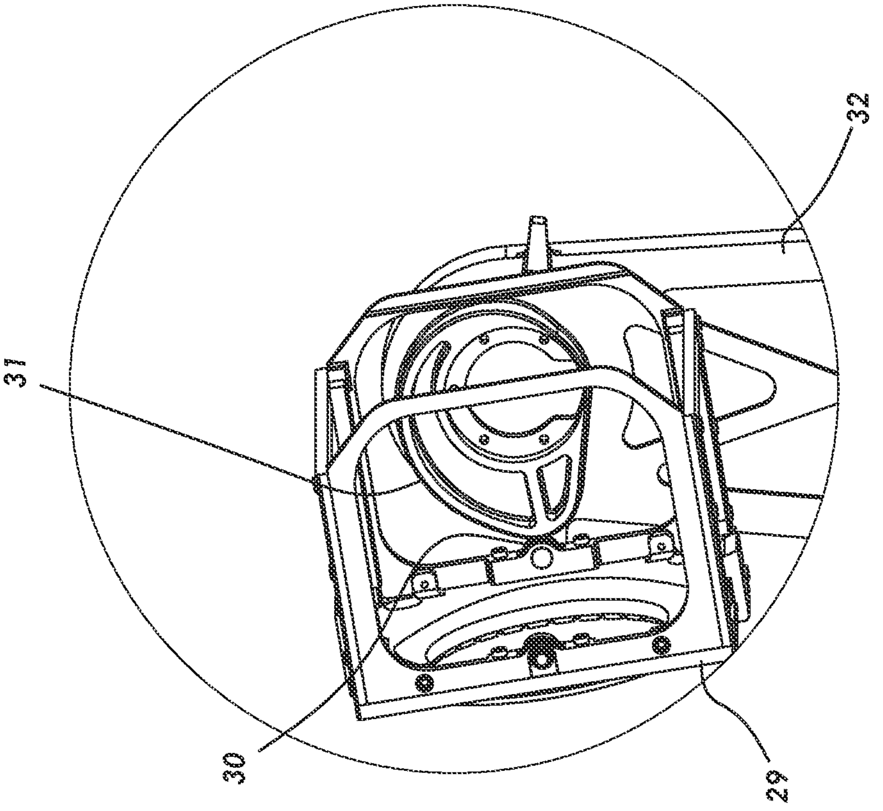
FIG. 17B is a perspective view of the particular embodiment of the follower and the camming surface shown in FIG. 17A.
Figure 17A:
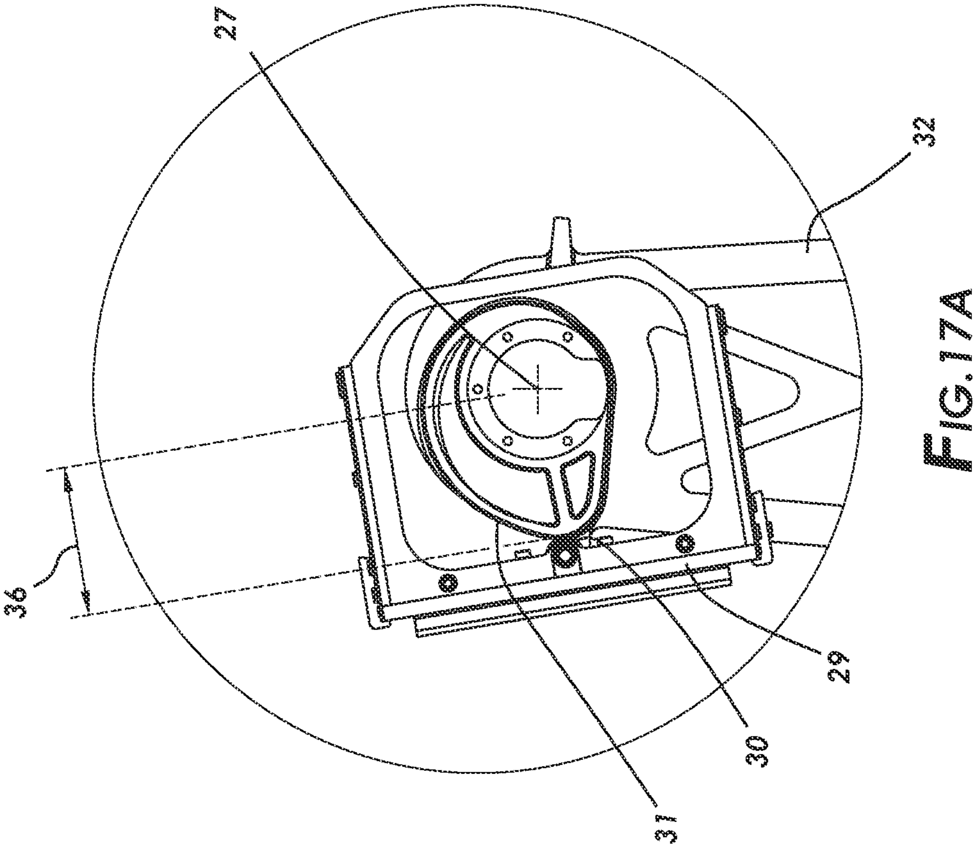
FIG. 17A is a front view of the particular embodiment of the antenna system shown in FIGS. 7A through 7G, illustrating the antenna's drivable member having one of its followers engaged with a camming surface.
Figure 18B:
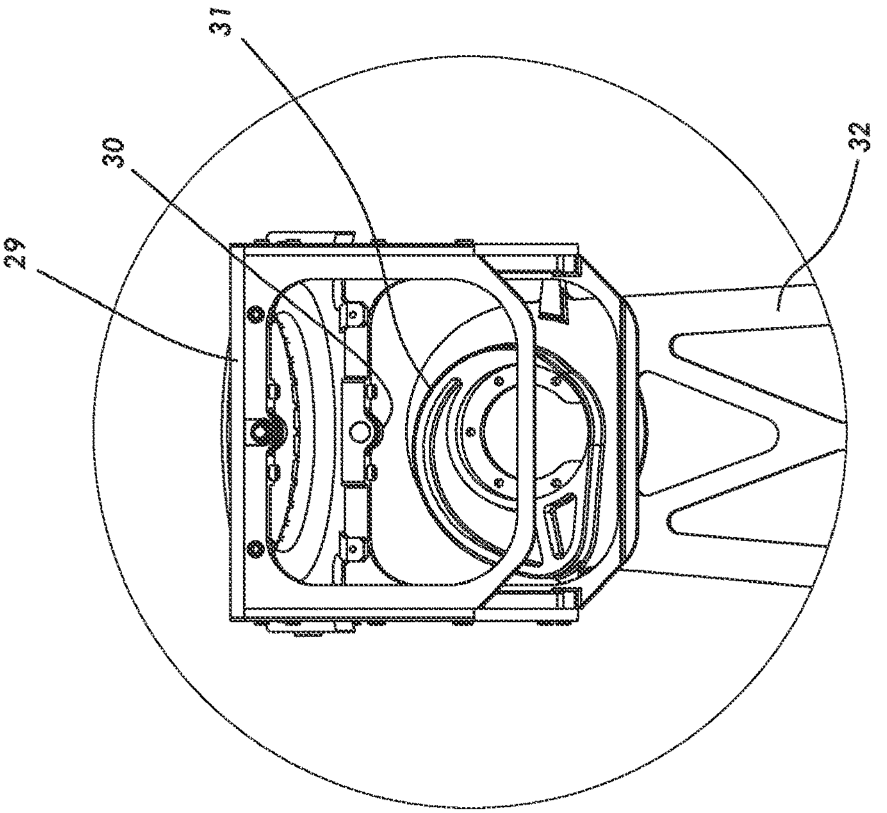
FIG. 18B is a perspective view of the particular embodiment of the follower and the camming surface shown in FIG. 18A.
Figure 18A:
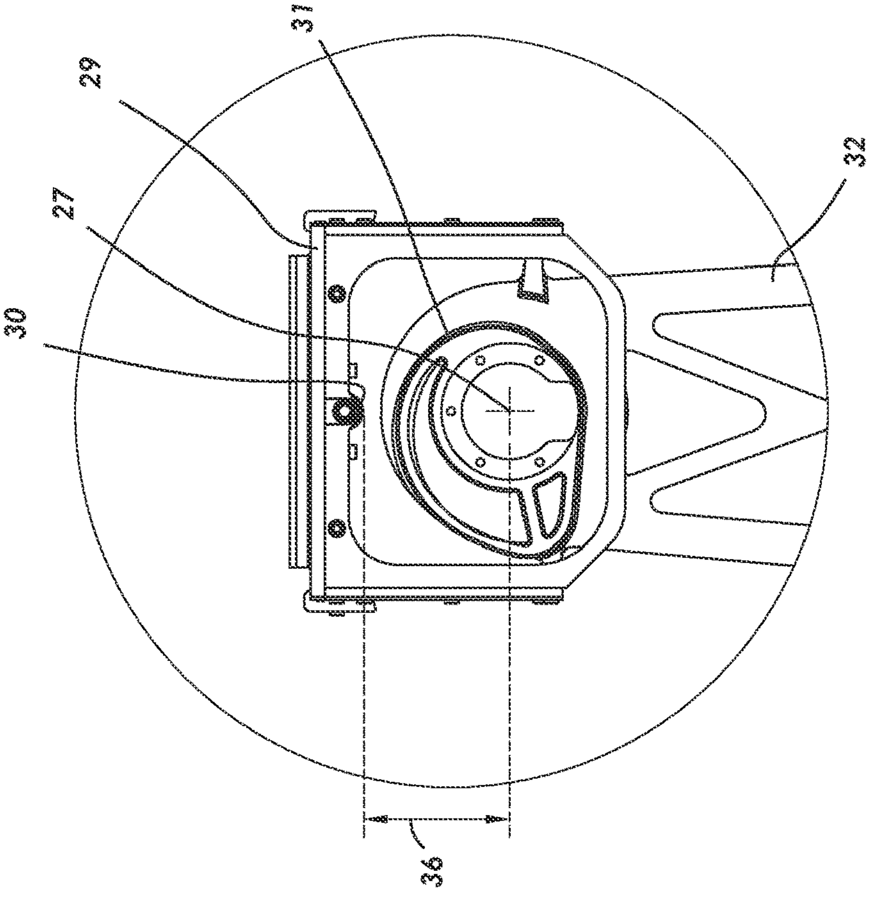
FIG. 18A is a front view of the particular embodiment of the antenna system shown in FIGS. 8A through 8G, illustrating the antenna's drivable member having one of its followers disengaged from a camming surface.
Figure 19A:
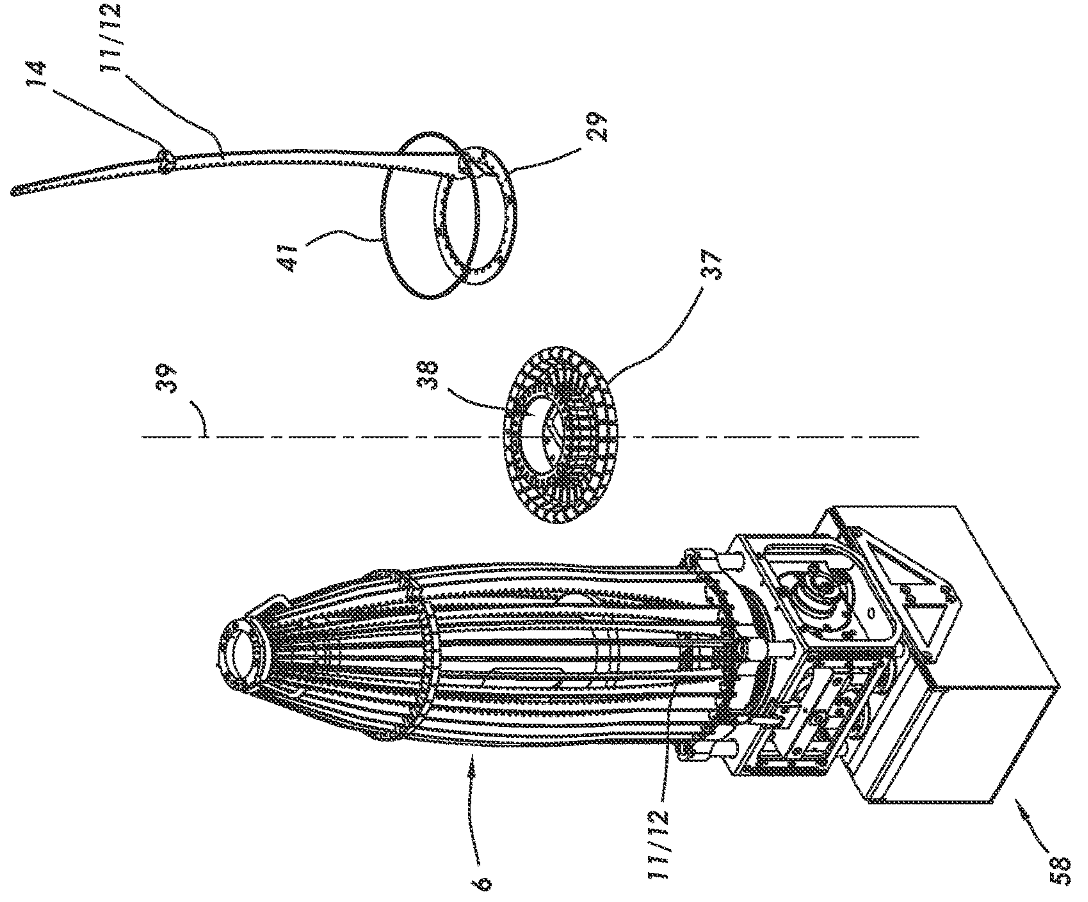
FIG. 19A is a perspective view of a particular embodiment of a reflector of the instant antenna system, whereby (i) the ribs dispose in a collapsed configuration, and (ii) the hub mount, the annular member, a portion of the drivable member, and one rib are shown exploded from the reflector.
Figure 19B:
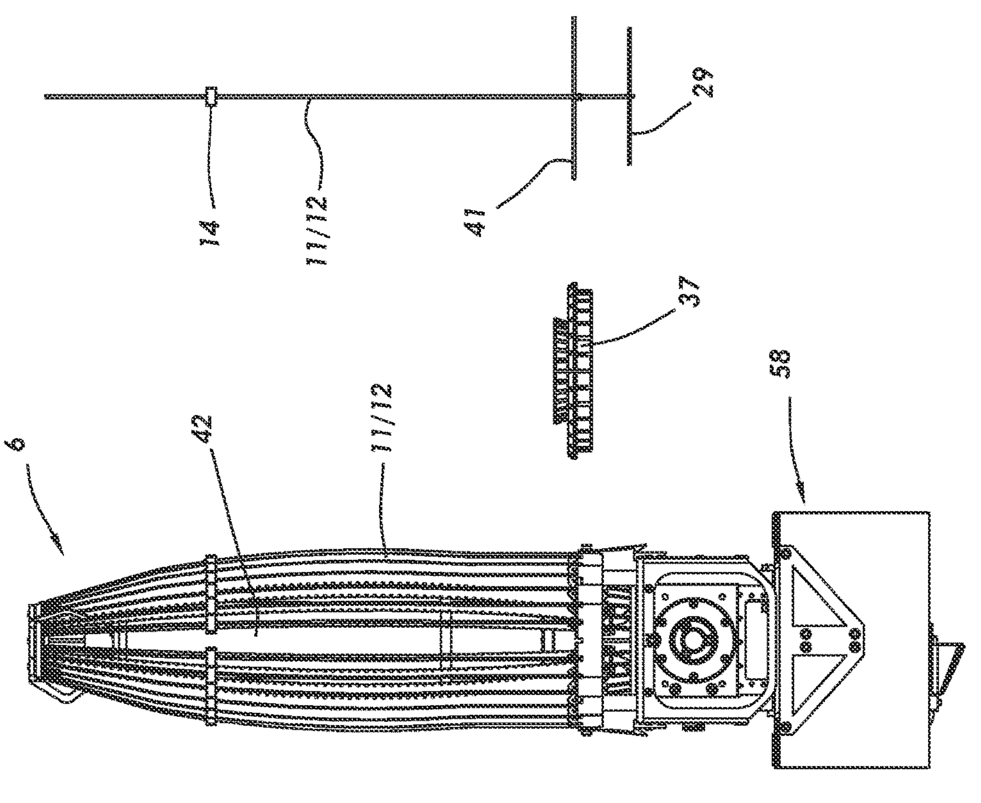
FIG. 19B is a front view of the particular embodiment of the reflector shown in FIG. 19A.

During pivoting and/or rotating of the reflector (6) to facilitate extension of the ribs (11) toward the extended configuration (28), the follower (30) can continue to dispose at the first distance (35), for example through about 55° of pivotal and/or rotational travel (as shown in the examples of FIGS. 15A and 15B). Upon further pivotal and/or rotational travel (as shown in the examples of FIGS. 16A and 16B), the distance between the follower (30) and the second axis (27) can increase, whereby upon disposition of the reflector (6) in the second position (25) (as shown in the example of FIGS. 17A and 17B), the follower (30) can dispose a second distance (36) from the second axis (27), the second distance (36) being greater than the first distance (35). Once disposed in the second position (25), the follower (30) and correspondingly the reflector (6) can be located at the relatively greatest distance from the second axis (27). Further pivotal and/or rotational travel of the reflector (6) about the second axis (27) beyond the second position (25) can be precluded by a stop element.

Upon additional pivotal and/or rotational travel of the reflector (6) between the first and second positions (24)(25), such as for directional adjustment of the reflector (6) to achieve a desired elevation, the follower (30) can remain disposed at the second distance (36) and accordingly, the follower (30) can be disengaged from the camming surface (31) during such travel. Of course, with the follower (30) remaining at the second distance (36), the distance between the reflector (6) and the second axis (27) remains constant during this travel as well.

Now referring primarily to FIGS. 19A through 22B, the reflector (6) comprises an annular array of spaced-apart ribs (11), typically rigid, coupled to a hub (37). The ribs (11) can be pivotally coupled to the hub (37), whereby this pivotal connection can facilitate adjustment of the ribs (11) between the collapsed and extended configurations (12)(28).

A central opening (38) can be defined by the hub (37), whereby the ribs (11) can be pivotally coupled to the hub (37) to dispose about the opening (38). A hub axis (39) can pass through the opening (38), whereby this axis (39) can provide a directional frame of reference for use herein. Following, the term “axial” can mean in a direction of, on, or along the hub axis (39).

As to particular embodiments, each rib first end (40) (or root) can be pivotally coupled to a pivot coupled to, connected to, or integrated with the hub (37). As to particular embodiments, the pivot can be configured as an annular member (41) to which each rib first end (40) can be pivotally coupled.

As to particular embodiments, each rib (11) can include a pivot point(s) proximate only its first end (40), meaning that the rib (11) in its collapsed configuration (12) can be a one-piece construct with a non-compactable length, meaning the rib (11) cannot be reduced in length, for example via folding upon itself.

Now referring primarily to FIGS. 19A through 20B, in the collapsed configuration (12), the ribs (11) can pivot relative to the hub (37) to dispose the ribs (11) along the hub axis (39) (such as in generally parallel relation to the hub axis (39)), and about a feed tower (42) such that the ribs (11) circumferentially surround the feed tower (42) and its corresponding components. Consequently, the stowed configuration (3) of the antenna (2) can be generally shaped as a cuboid, rectangular prism, cylinder, or the like, or combinations thereof, which may allow accommodation of the antenna (2) as a compact volume and/or within a container (4). As but one illustrative example, when in the stowed configuration (3) the antenna (2) can have a volume of about 76 cm×18 cm×16 cm.

Now referring primarily to FIGS. 21A through 22B, to achieve the extended configuration (28) from the collapsed configuration (12), the ribs (11) can pivot away from the hub axis (39) to outwardly extend from the hub (37).

Now referring primarily to FIGS. 19A through 22B, as to particular embodiments, the ribs (11) can be driven toward the extended configuration (28) by a driver, such as a motor.

As an illustrative example, the ribs (11) can be coupled to a drivable member which can be driven along the hub axis (39) by the driver.

As to particular embodiments, the ribs (11) can be coupled to the drivable member (29) and driven toward the extended configuration (28) by the second driver (22) as detailed above, whereby upon pivotal and/or rotational travel of the reflector (6) about the second axis (27), the ribs (11) can extend from the collapsed configuration (12) to the extended configuration (28). As to particular embodiments in which the distance between the follower (30) and the second axis (27) increases after about 55° of pivotal and/or rotational travel from the 0° first position (24) of the reflector (6), the ribs (11) can begin their extension during this latter part of the travel.

Figure 12B:
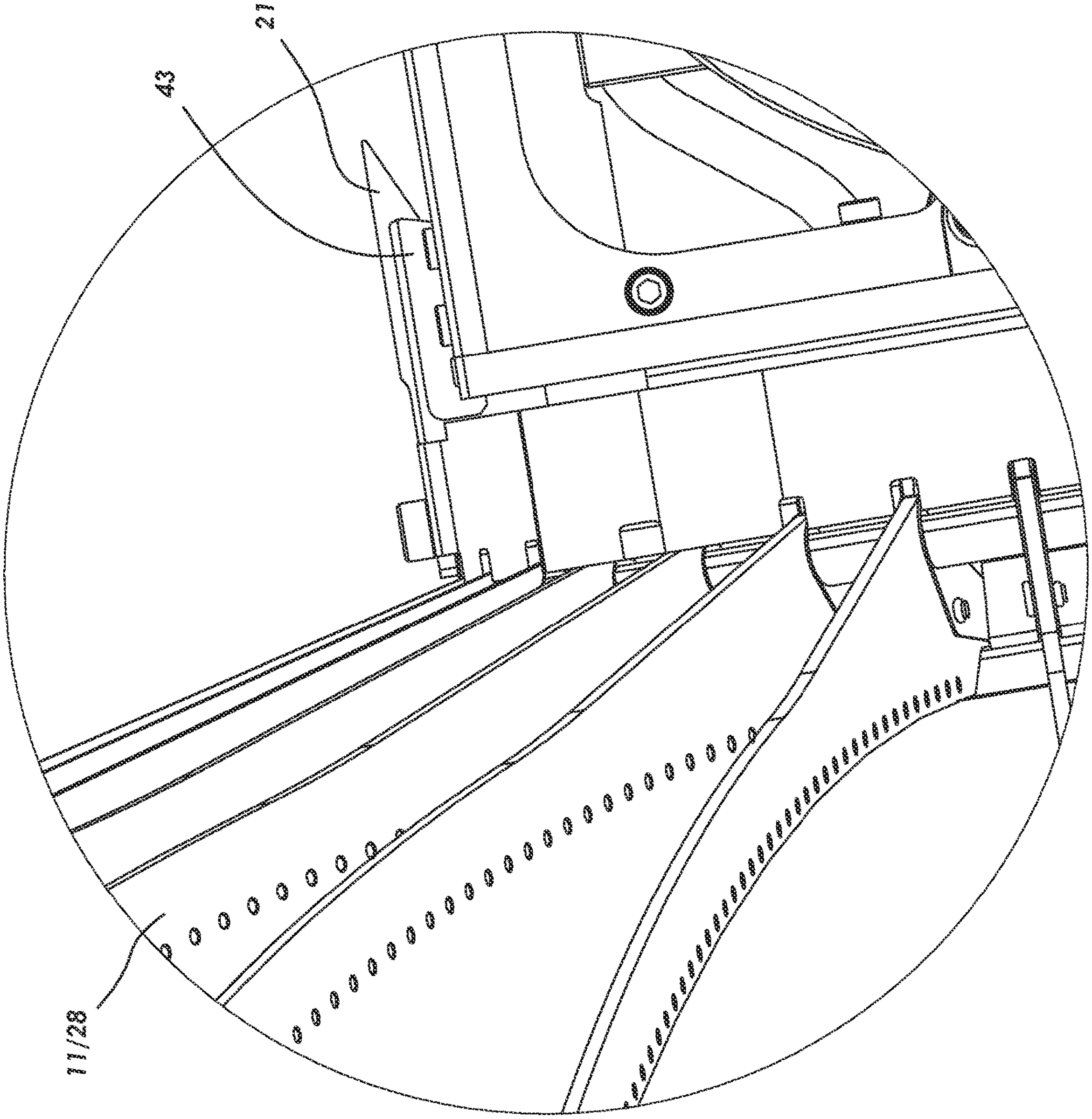
FIG. 12B is an enlarged view of a portion of the antenna system shown in FIG. 7B.

Now referring primarily to FIG. 12B, once achieved, the ribs (11) can be retained in the extended configuration (28) by the second lock element (21) to effectively secure the ribs (11) in the extended configuration (28). As but one illustrative example, the second lock element (21) can be configured as a pawl which, upon axial movement facilitated by the pivoting and/or rotating of the reflector (6) driven by the second driver (22), lockingly engages with an engagement element (43) to lock the ribs (11) in the extended configuration (28).

Figure 20B:
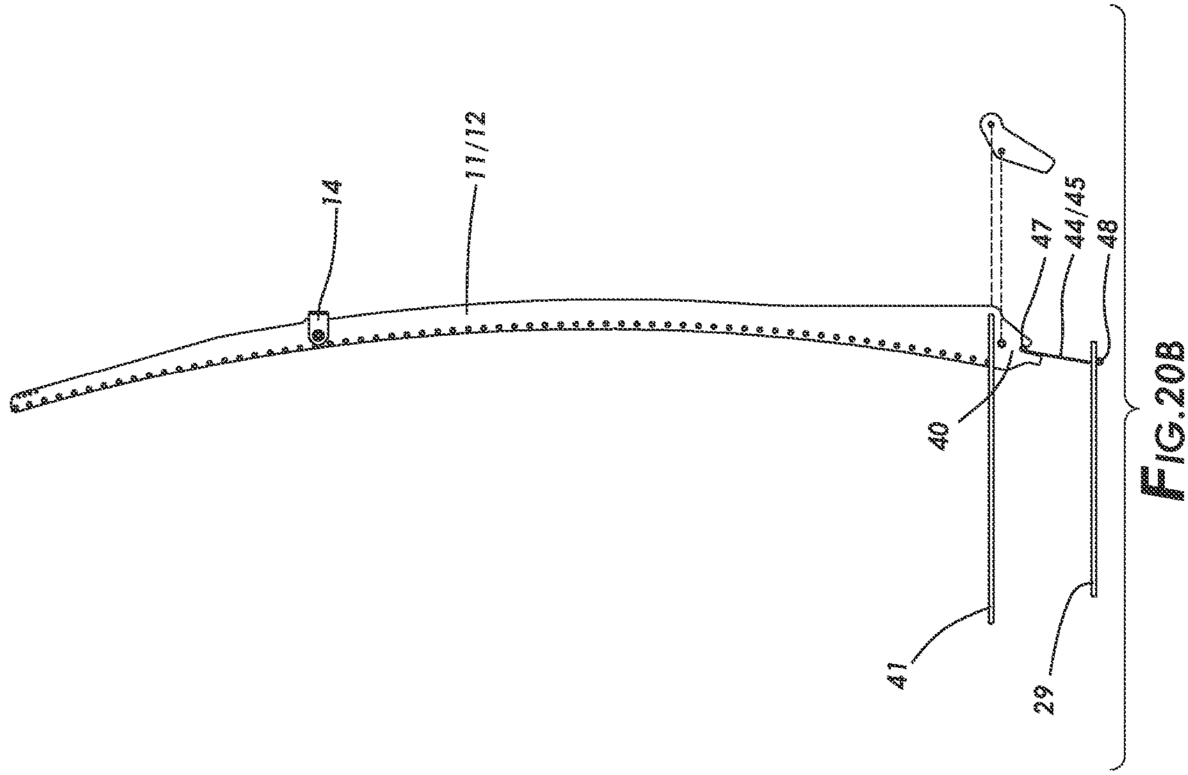
FIG. 20B is a side view of the antenna system components shown in FIG. 20A.
Figure 20A:
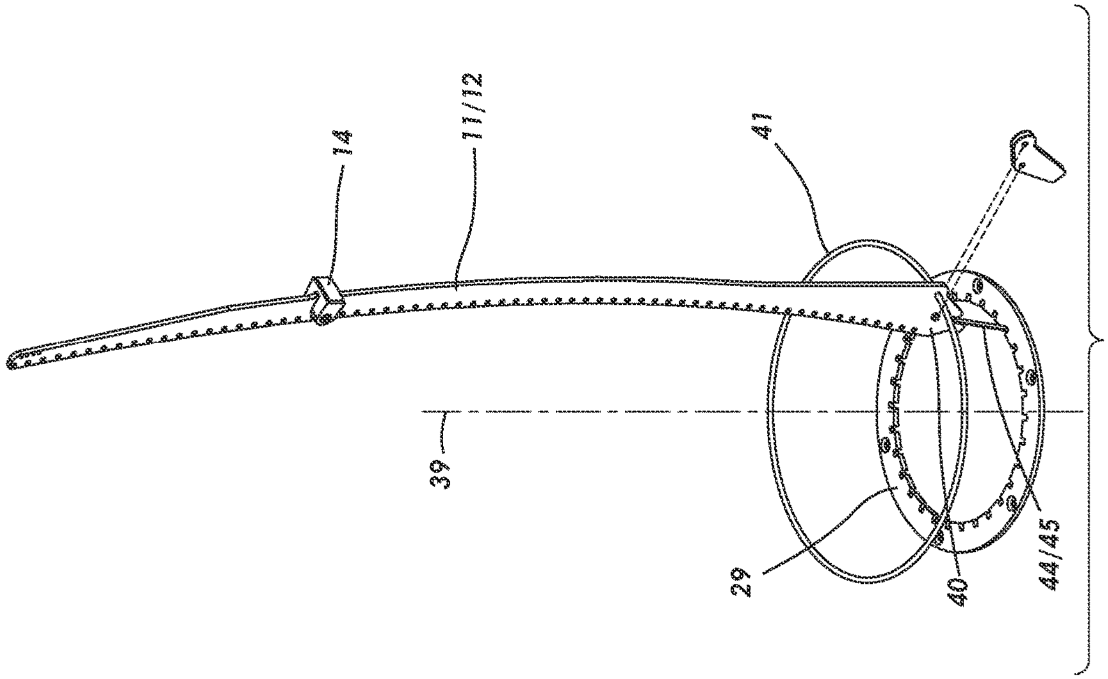
FIG. 20A is a perspective view of the annular member, the portion of the drivable member, and the rib and its corresponding spring shown in FIGS. 19A and 19B, whereby the rib plates are shown exploded from the rib.
Figure 21A:
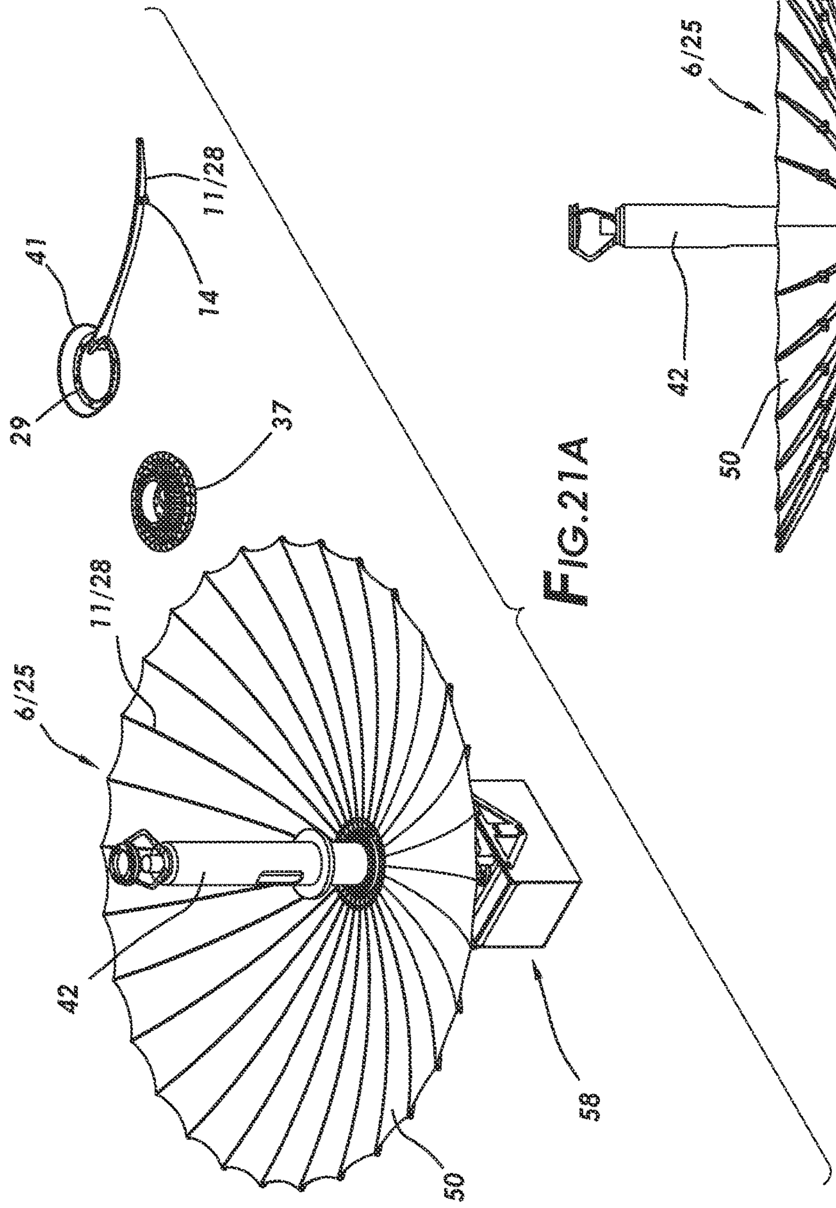
FIG. 21A is a perspective view of a particular embodiment of a reflector of the instant antenna system, whereby (i) the ribs dispose in an extended configuration, and (ii) the hub mount, the annular member, a portion of the drivable member, and one rib are shown exploded from the reflector.
Figure 21B:
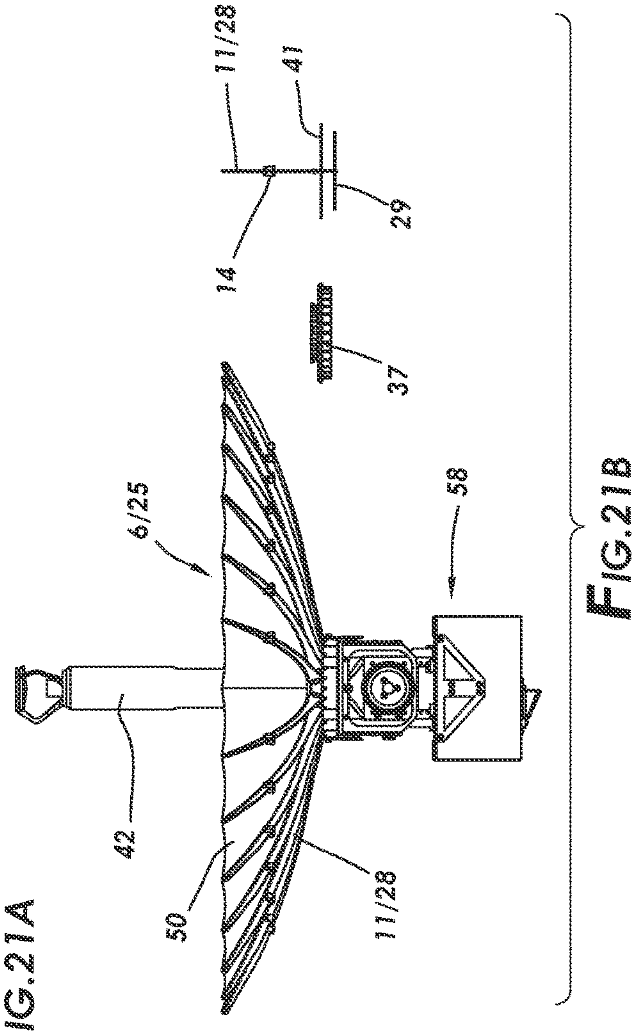
FIG. 21B is a front view of the particular embodiment of the reflector shown in FIG. 21A.
Figure 22A:
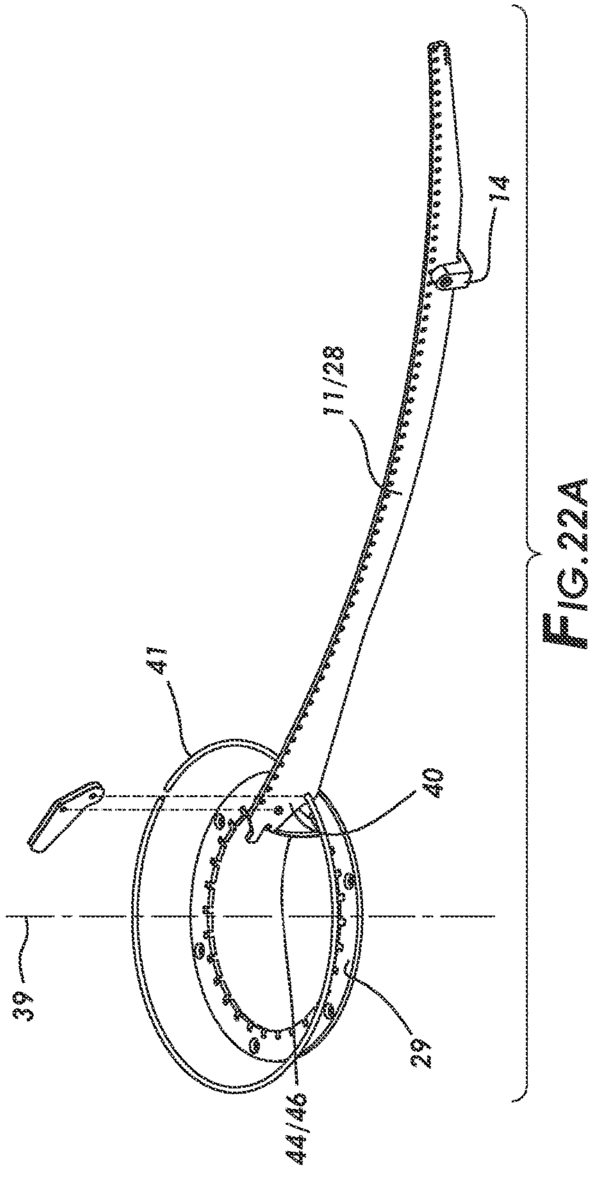
FIG. 22A is a perspective view of the annular member, the portion of the drivable member, and the rib and its corresponding spring shown in FIGS. 21A and 21B, whereby the rib plates are shown exploded from the rib.
Figure 22B:
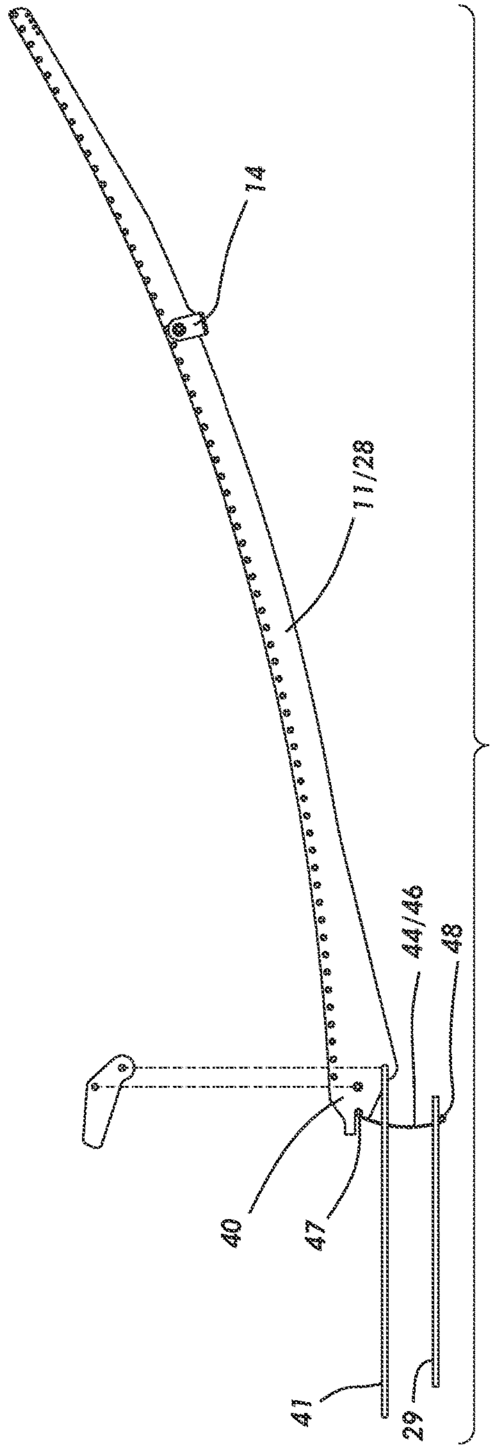
FIG. 22B is a side view of the antenna system components shown in FIG. 22A.

Now referring primarily to FIGS. 20A, 20B, 22A, and 22B, as to particular embodiments, each rib (11) can be coupled to the drivable member (29) by a spring (44), whereby the spring (44) can be of any type (such as extension, compression, leaf, etc.) sufficient for the intended use described herein. As to particular embodiments, the spring (44) can be (i) relatively linear along its length when in an unbiased condition (45) (as shown in the examples of FIGS. 20A and 20B), and (ii) compressed along its length into an arcuate or curved configuration when in a biased condition (46) (as shown in the examples of FIGS. 22A and 22B) generated by movement of the drivable member (29) toward the hub (37), whereby this movement facilitates pivoting of the ribs (11) away from the hub axis (39) for outward extension from the hub (37).

As to these particular embodiments, the ribs (11) can be both pivotally coupled to (i) the hub (37), for example via the annular member (41), and (ii) the spring (44), whereby a spring end (47) can provide the pivot point, the opposing spring end (48) being coupled to the drivable member (29).

As to particular embodiments, an adjuster (49) can be coupled to each rib (11) (as can be seen in the example of FIG. 24B), whereby the adjuster (49) can allow for fine tuning of the ribs if needed.

Now referring primarily to FIGS. 7A through 7G, when the antenna (2) disposes in the second orientation (18) and the ribs (11) are secured in the extended configuration (28), the deployed configuration (5) of the antenna (2) can be achieved or, said another way, the antenna (2) can be deployed.

The reflector (6) can further include a reflective material (50) coupled to the ribs (11), whereby the reflective material (50) can facilitate interaction with a remote target. As but one illustrative example, the reflective material (50) can comprise mesh. As to particular embodiments, the mesh can exert a bloom force on the ribs (11). Of note, in the instant drawings, the reflective material (50) is only illustrated in the figures showing the deployed configuration (5) of the antenna (2), although of course the reflective material (50) is present in all configurations.

Importantly, upon deployment, the reflector (6) can dispose in spaced-apart relation to the surface (7) and/or the container (4), thereby permitting unimpeded directional adjustment of the reflector (6) to point the reflector (6) toward a remote target. Said another way, once deployed, the reflector (6) can be located a sufficient distance from the surface (7) and/or the container (4) to allow the directional adjustment disclosed herein.

As to particular embodiments, when the antenna (2) disposes in the deployed configuration (5), the reflector (6) can be spaced apart from the surface (7) and/or the container (4) a distance of at least half of its diameter.

Now referring primarily to FIGS. 23, 24A, 24B, and 25, when the antenna (2) disposes in the deployed configuration (5), the reflector (6) can be adjustable in elevation (51). Correspondingly, the antenna system (1) can include a pivotable and/or rotatable support such as a first gimbal (52) fixedly coupled to the reflector (6) to facilitate pivotal and/or rotational movement of the reflector (6), for example relative to the support (32). The first gimbal (52) can be operatively coupled to a driver and in particular, to the second driver (22), which can drive the first gimbal (52) to pivot about the second axis (27), correspondingly pivoting the reflector (6) about the second axis (27) to adjust the elevation (51) of the reflector (6).

As to particular embodiments, the reflector (6) can be adjustable in elevation (51) by up to at least about ±90° from its centered or 0° position (as shown in the example of FIGS. 8A through 8G, and FIG. 23), whereby in the centered or 0° position, the feed tower (42) disposes along the hub axis (39).

As to particular embodiments, the reflector (6) can be adjustable in elevation (51) by up to at least about ±87° from its centered or 0° position (as shown in the examples of FIG. 8A through 8G, and FIG. 23), whereby in the centered or 0° position, the feed tower (42) disposes along the hub axis (39).

As to particular embodiments, a stop element can preclude excessive travel of the first gimbal (52) about the second axis (27).

Now referring primarily to FIGS. 23, 24A, 24C, and 25, when the antenna (2) disposes in the deployed configuration (5), the reflector (6) can be adjustable in azimuth (53). Accordingly, the antenna system (1) can include a pivotable and/or rotatable support such as a second gimbal (54) fixedly coupled to the reflector (6) to facilitate pivotal and/or rotational movement of the reflector (6) about a third axis (55). As to particular embodiments, the second gimbal (54) can facilitate pivotal and/or rotational movement of the reflector (6), the first gimbal (52), and the support (32) about the third axis (55). The second gimbal (54) can be operatively coupled to a driver and in particular, to a third driver (56) (such as a third motor operatively coupled to a drive shaft (57)), which can drive the second gimbal (54) to pivot about the third axis (55), correspondingly pivoting the reflector (6) about the third axis (55) to adjust the azimuth (53) of the reflector (6).

As to particular embodiments, the reflector (6) can be adjustable in azimuth (53) by up to at least about ±187.5° from its centered or 0° position (as shown in the example of FIG. 8A through 8G, and FIG. 23).

As to particular embodiments, a stop element can preclude excessive travel of the second gimbal (54) about the third axis (55).

Figure 23:
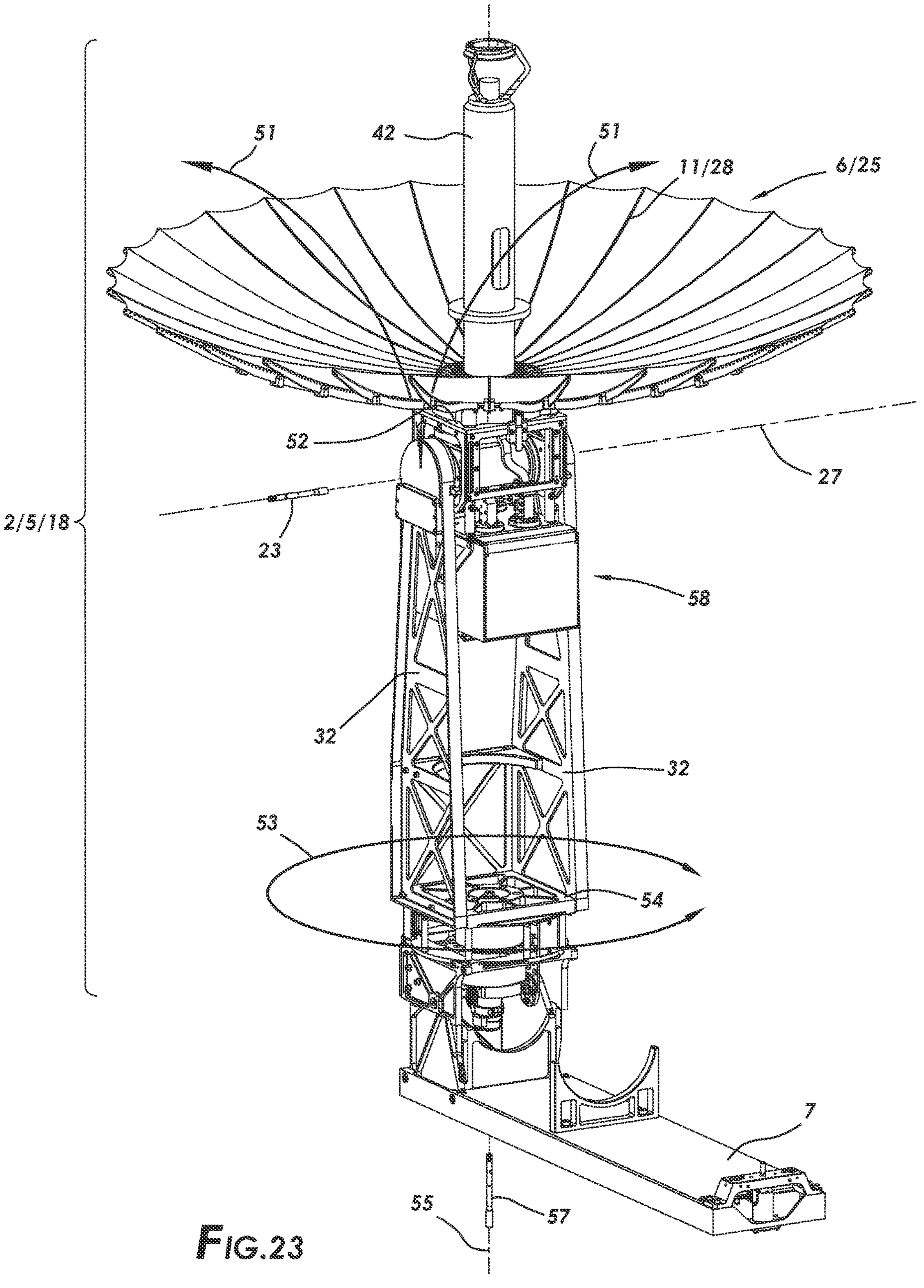
FIG. 23 is a perspective view of a particular embodiment of the instant antenna system in which the antenna is deployed and the reflector is directionally adjusted, whereby drive shafts are shown exploded from their corresponding drivers.

Now referring primarily to FIG. 23, the first and second gimbals (52)(54) can (i) dispose in axially spaced apart relation and (ii) be coupled together by the support (32), whereby a portion of the gimballed payload and in particular, the reflector (6), can dispose between the first and second gimbals (52)(54) when the antenna (2) disposes in the stowed configuration (3). Additionally, when the antenna (2) disposes in the deployed configuration (5), the axially spaced-apart relation of the first and second gimbals (52) (54) can permit the reflector (6) to have full range of pivotal and/or rotational motion about the second axis (27).

Figure 8A:
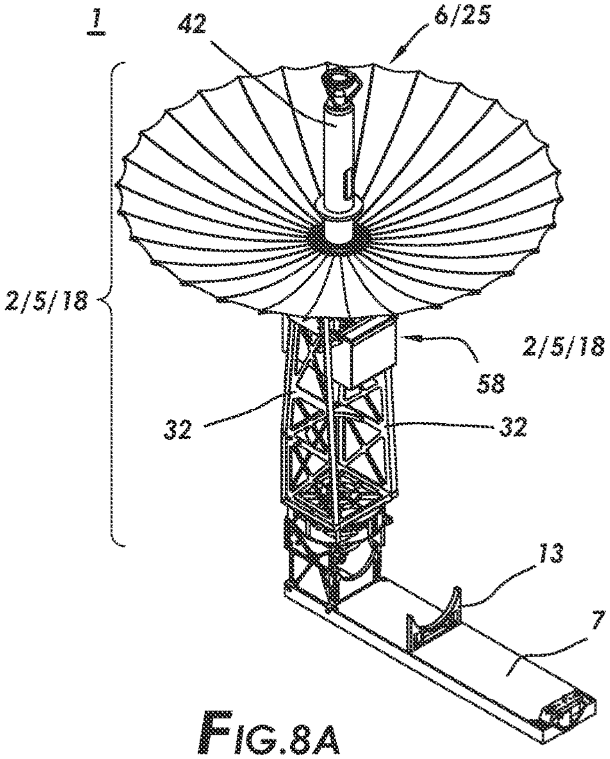
FIG. 8A is a perspective view of the particular embodiment of the antenna system shown in FIGS. 7A through 7G, whereby the reflector is directionally adjusted.
Figure 8B:
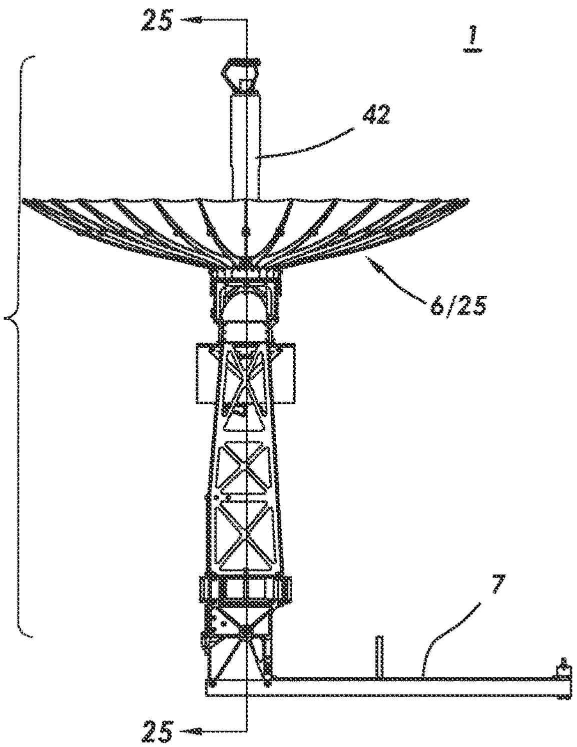
FIG. 8B is a front view of the particular embodiment of the antenna system shown in FIG. 8A.
Figure 8C:
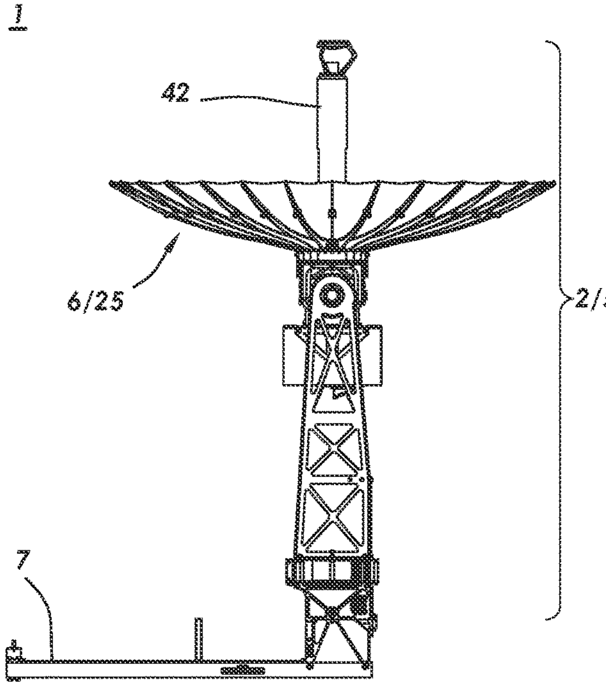
FIG. 8C is a rear view of the particular embodiment of the antenna system shown in FIG. 8A.
Figure 8D:
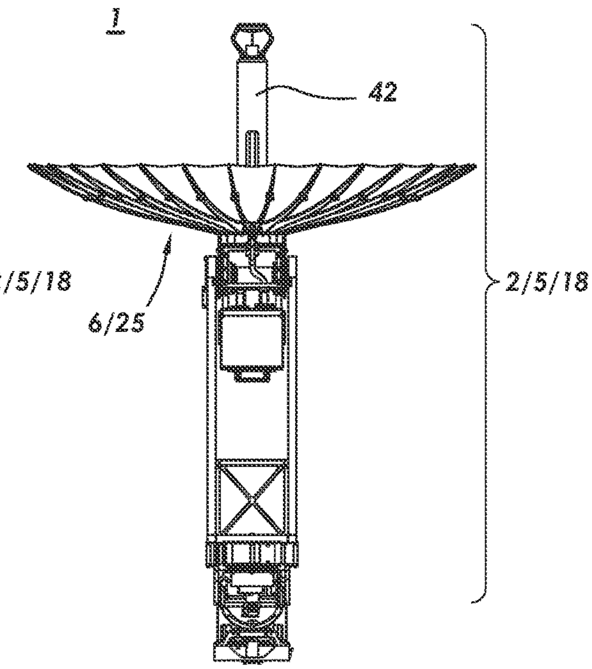
FIG. 8D is a first side view of the particular embodiment of the antenna system shown in FIG. 8A.
Figure 8F:
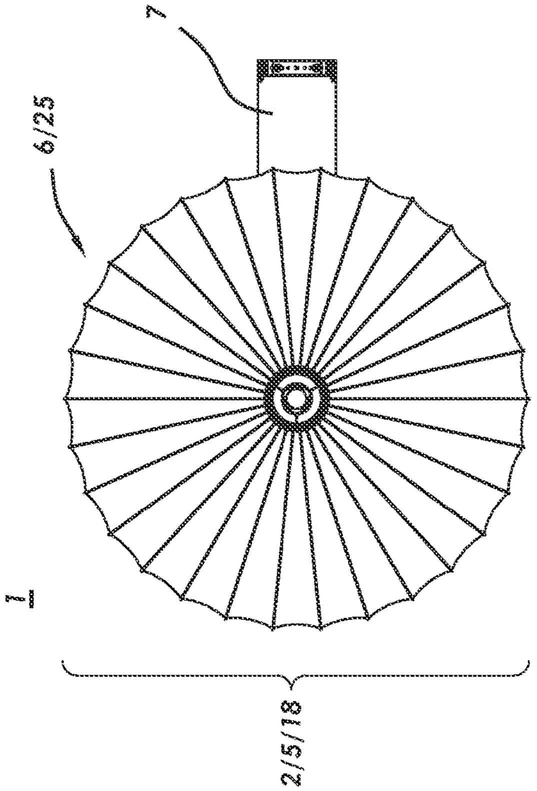
FIG. 8F is a top view of the particular embodiment of the antenna system shown in FIG. 8A.
Figure 8G:
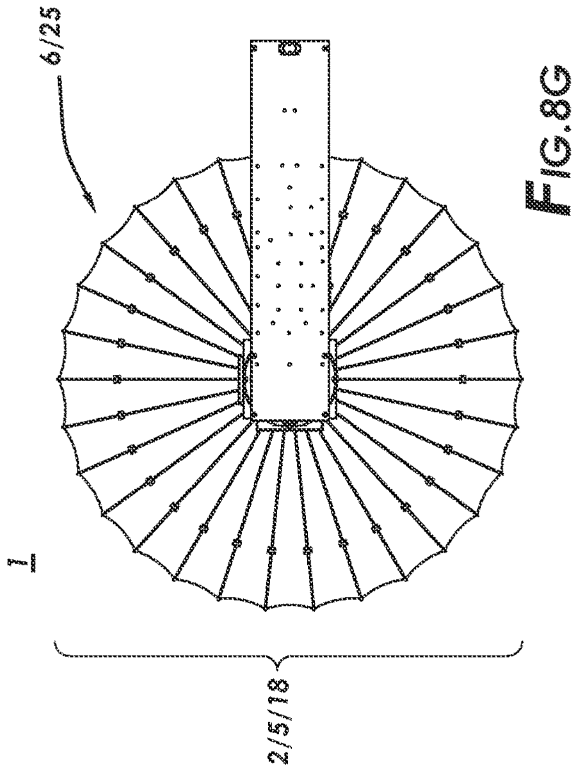
FIG. 8G is a bottom view of the particular embodiment of the antenna system shown in FIG. 8A.
Figure 8E:
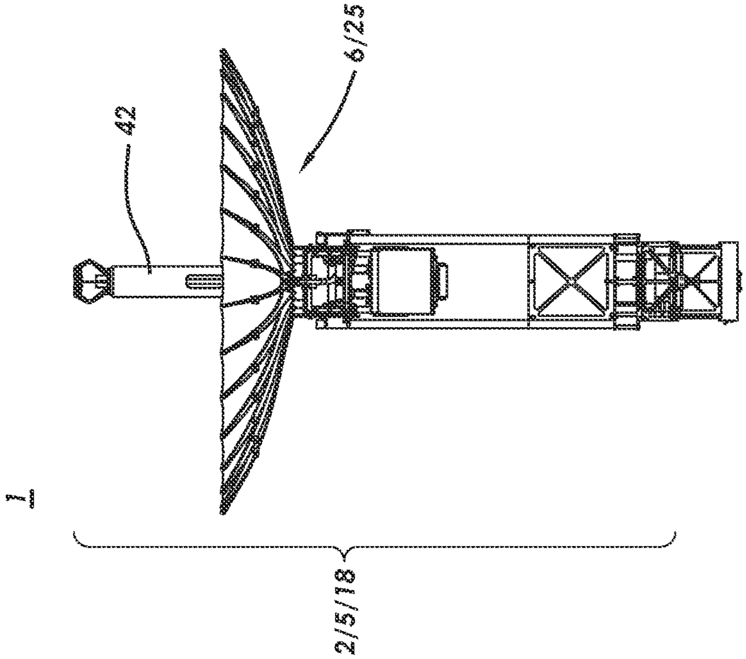
FIG. 8E is a second side view of the particular embodiment of the antenna system shown in FIG. 8A.
Figure 9:
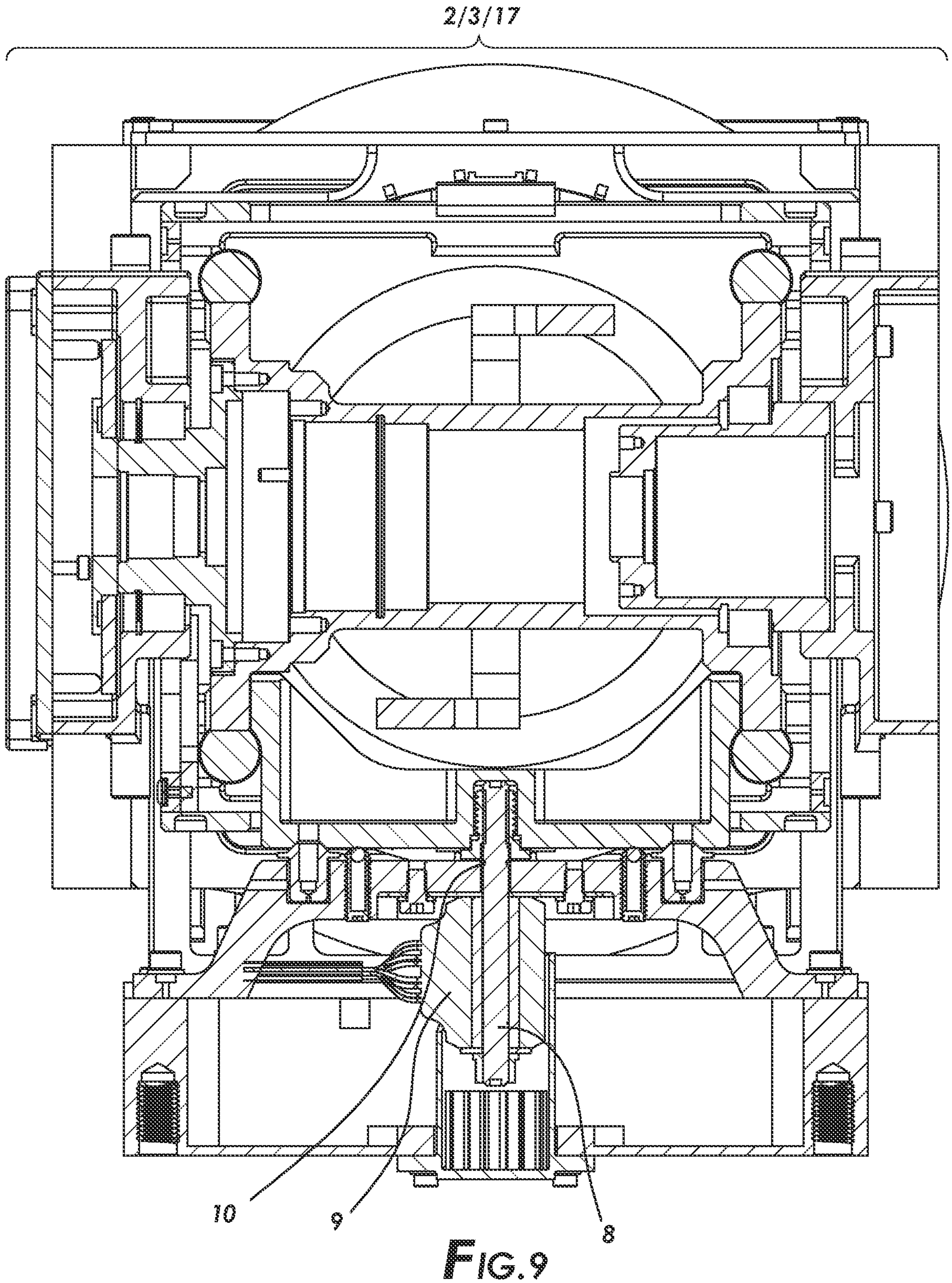
FIG. 9 is a cross-sectional view of the particular embodiment of the antenna system shown in FIG. 3B along 9-9.
Figure 10:
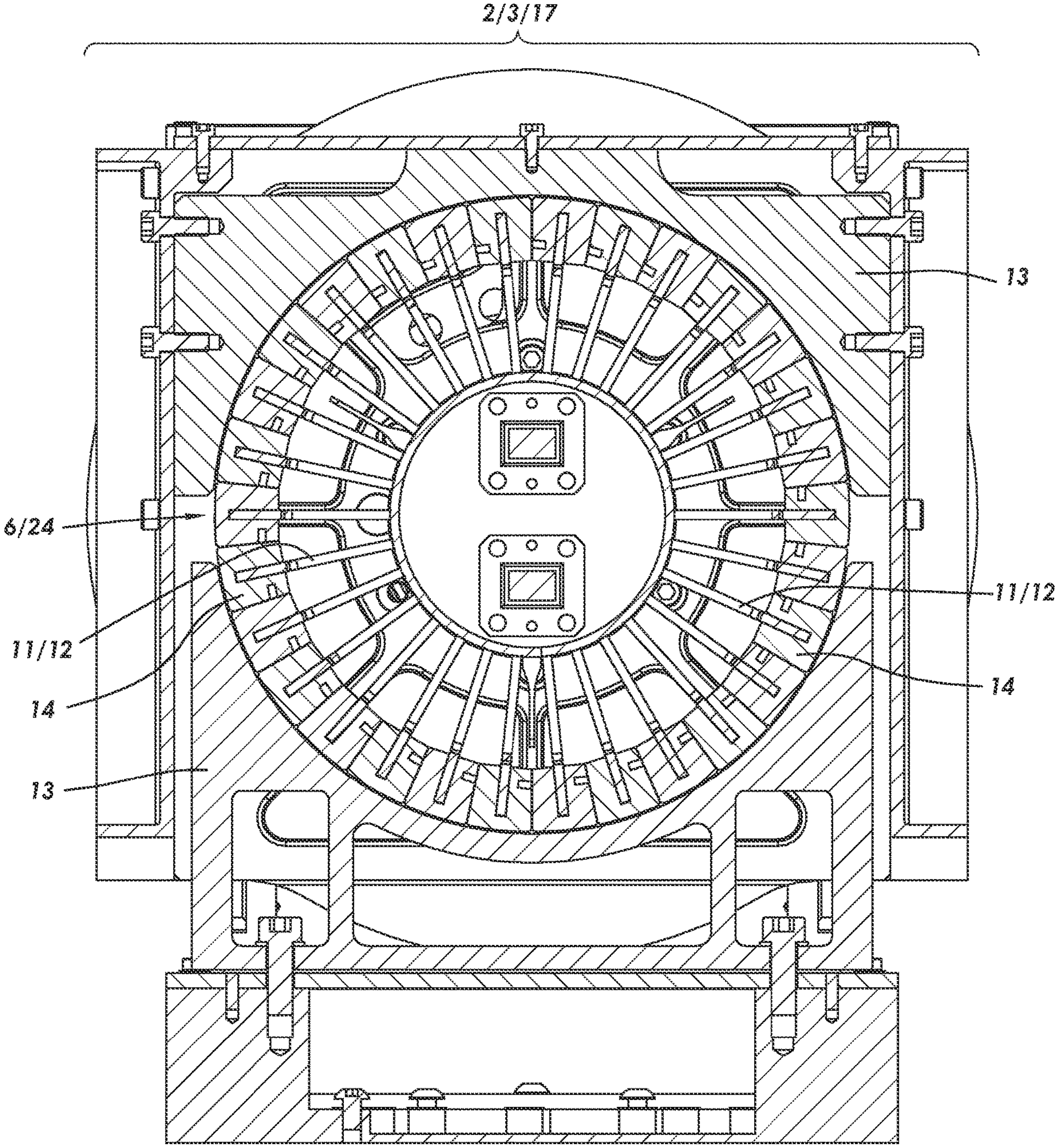
FIG. 10 is a cross-sectional view of the particular embodiment of the antenna system shown in FIG. 3B along 10-10.

Now referring primarily to FIGS. 8B through 8D, the antenna (2) can further include a transmitter, a receiver, and/or a transceiver (58) which can facilitate interaction between the instant antenna system (1) and a remote target, whereby the transceiver (58) can be directly coupled to the reflector (6) (and correspondingly, its associated signal) to dispose the transceiver (58) in close spatial relation to the reflector (6). As to particular embodiments, the reflector (6) can be coupled, directly coupled, connected, or directly connected to a first side (59) of the first gimbal (52) and the transceiver (58) can be coupled, directly coupled, connected, or directly connected to an opposing second side (60) of the first gimbal (52) to dispose the transceiver (58) in close spatial relation to the reflector (6). As to this particular embodiment, the transceiver (58) can pivot along with the reflector (6) about the second axis (27) upon pivotal and/or rotational movement of the first gimbal (52).

Such a location of the transceiver (58) relative to the reflector (6) may be beneficial in that it can provide a relatively short transmission path between the reflector (6) and the transceiver (58), thereby minimizing radio frequency loss. As to particular embodiments, the transmission path can be directly through the feed tower (42) or waveguide and consequently, not via a coaxial cable. Additionally, in such a configuration, the transceiver (58) and its associated housing can function as a counterbalance for the reflector (6) when pivoting and/or rotating about the second axis (27). Further, with such a counterbalance, the center of gravity of the antenna (2) may not or does not change over the range of directional adjustment. Moreover, such a location of the transceiver (58) and its associated housing can dispose the transceiver (58) outside of the container (4), which positions the transceiver (58) proximate a radiative surface(s) for heat dissipation.

As to particular embodiments, the antenna system (1) can further include one or more controllers and the associated circuitry to control (i) deployment of the antenna (2) and (ii) directional adjustment of the reflector (6), for example to control pivotal and/or rotational movement of the first gimbal (52) to adjust the elevation (51) of the reflector (6) and/or to control pivotal and/or rotational movement of the second gimbal (54) to adjust the azimuth (53) of the reflector (6).

Now regarding production, a method of making the instant antenna system (1) can include coupling an antenna (2) to one or more deployers, such as a first driver (15) and a second driver (22), whereby the deployer can be configured to pivotally and/or rotatably deploy the antenna (2) from a compact volume and/or from within a container (4).

As to particular embodiments, the method can further include coupling a first gimbal (52) to the antenna (2), whereby the first gimbal (52) can be configured to adjust the elevation (51) of the antenna (2) when the antenna (2) is deployed from the compact volume and/or from within the container (4).

As to particular embodiments, the method can further include coupling a second gimbal (54) to the antenna (2), whereby the second gimbal (54) can be configured to adjust the azimuth (53) of the antenna (2) when the antenna (2) is deployed from the compact volume and/or from within the container (4).

The method of making the antenna system (1) can further include providing additional components of the antenna system (1), as described above and in the claims.

Now regarding employment, a method of using the instant antenna system (1) can include positioning the antenna system (1) in a desired location.

As to particular embodiments, a method of using the instant antenna system (1) can include launching the antenna system (1) into space.

The method can further include deploying the antenna (2) from the compact volume and/or from within the container (4), such as by operating one or more deployers, such as a first driver (15) and a second driver (22), to pivotally and/or rotatably deploy the antenna (2) from the compact volume and/or from within the container (4).

The method can further include adjusting a direction of the antenna (2).

As to particular embodiments, the method can further include adjusting the elevation (51) of the antenna (2), for example by operating the first gimbal (52).

As to particular embodiments, the method can further include adjusting the azimuth (53) of the antenna (2), for example by operating the second gimbal (54).

As to particular embodiments, the method can further include adjusting both the elevation (51) and the azimuth (53) of the antenna (2).

As to particular embodiments, the method can further include operating the antenna (2) to interact with a remote target.

As can be easily understood from the foregoing, the basic concepts of the present invention may be embodied in a variety of ways. The invention involves numerous and varied embodiments of an antenna system and methods for making and using such an antenna system.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or a method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "coupler" should be understood to encompass disclosure of the act of "coupling"—whether explicitly discussed or not—and, conversely, were there effectively disclosure of the act of "coupling", such a disclosure should be understood to encompass disclosure of a "coupler" and even a "means for coupling." Such alternative terms for each element or step are to be understood to be explicitly included in the description.

In addition, as to each term used, it should be understood that unless its utilization in this application is inconsistent with such interpretation, common dictionary definitions should be understood to be included in the description for each term as contained in Merriam-Webster's Dictionary, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about", it will be understood that the particular value forms another embodiment. The term "about" generally refers to a range of numeric values that one of skill in the art would consider equivalent to the recited numeric value or having the same function or result. Similarly, the antecedent "substantially" or "generally" means largely, but not wholly, the same form, manner or degree and the particular element will have a range of configurations as a person of ordinary skill in the art would consider as having the same function or result. When a particular element is expressed as an approximation by use of the antecedent "substantially" or "generally", it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Further, for the purposes of the present invention, the term "coupled" or derivatives thereof can mean indirectly coupled, coupled, directly coupled, connected, directly connected, or integrated with, depending upon the embodiment.

Thus, the applicant should be understood to claim at least: (i) each embodiment of the antenna system herein disclosed and described, (ii) the related methods disclosed and described, (iii) similar, equivalent, and even implicit variations of each of these apparatuses and methods, (iv) those alternative embodiments which accomplish each of the functions shown, disclosed, or described, (v) those alternative designs and methods which accomplish each of the functions shown as are implicit to accomplish that which is disclosed and described, (vi) each feature, component, and step shown as separate and independent inventions, (vii) the applications enhanced by the various systems or components disclosed, (viii) the resulting products produced by such systems or components, (ix) methods and apparatuses substantially as described hereinbefore and with reference to any of the accompanying examples, and (x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of embodiments of the invention and are not to be construed as the broadest embodiment of the invention or a complete listing of embodiments of the invention that may be claimed. The applicant does not waive any right to develop further claims based upon the description set forth above or in the drawings as a part of any continuation, division, continuation-in-part, or similar application.

The invention claimed is:

1. A method of making an antenna system, comprising:

coupling an antenna to a deployer configured to pivotally or rotatably deploy said antenna from a surface;

said antenna adjustable between a stowed configuration and a deployed configuration, comprising:

a reflector comprising an annular array of spaced-apart ribs coupled to a hub comprising a hub axis which passes through an opening defined by said hub, said ribs adjustable between a collapsed configuration and an extended configuration in which said ribs outwardly extend from said hub;

wherein when said ribs dispose in said collapsed configuration, said antenna is disposable in said stowed configuration; and wherein when said antenna disposes in said deployed configuration:

(i) said ribs dispose in said extended configuration; and (ii) said reflector is directionally adjustable;

disposing a feed tower along said hub axis; and operably coupling a first driver to said antenna, said first driver configured to drive pivoting or rotating of said antenna about a first axis from a first orientation toward a second orientation.

2. The method of claim 1, wherein upon deployment, said antenna disposes in spaced-apart relation to said surface.

3. The method of claim 1, wherein upon deployment, said reflector disposes a distance of at least half of its diameter from said surface.

4. The method of claim 1, further comprising coupling a transceiver to said antenna.

5. The method of claim 4, further comprising coupling said transceiver to a gimbal opposite said reflector.

6. The method of claim 1, further comprising pivotally coupling said ribs to said hub.

7. The method of claim 6, further comprising pivotally coupling first ends of each rib of said ribs to a pivot coupled to said hub; said pivot configured as an annular member.

8. The method of claim 6, further comprising operably coupling a second driver to said ribs, said second driver configured to drive pivoting of said ribs away from said hub axis to outwardly extend from said hub.

9. The method of claim 1, further comprising pivotally or rotatably coupling said antenna to said surface proximate an antenna first end.

10. The method of claim 9, further comprising releasably coupling said antenna to said surface proximate an antenna second end.

11. The method of claim 10, wherein the releasably coupling facilitates retention of said antenna in said stowed configuration prior to deployment.

12. The method of claim 10, further comprising coupling a releasable retention element to said antenna, wherein said releasable retention element releasably couples said antenna to said surface.

13. The method of claim 12, said retention element configured as a frangible bolt.

14. The method of claim 1, further comprising coupling a stop element to said antenna, wherein said stop element precludes pivotal or rotational travel of said antenna beyond said second orientation.

15. The method of claim 1, further comprising coupling a lock element to said antenna, wherein said lock element secures said antenna in said second orientation.

16. The method of claim 1, said reflector adjustable in elevation.

17. The method of claim 16, further comprising coupling a first gimbal to said antenna, said first gimbal configured to adjust said elevation of said antenna when said antenna is deployed.

18. The method of claim 1, said reflector adjustable in azimuth.

19. The method of claim 18, further comprising coupling a second gimbal to said antenna, said second gimbal configured to adjust said azimuth of said antenna when said antenna is deployed.

20. The method of claim 1, further comprising coupling first and second gimbals to said antenna; said first gimbal configured to adjust elevation of said antenna when said antenna is deployed; and said second gimbal configured to adjust azimuth of said antenna when said antenna is deployed.

* * * * *